US012697738B2

(12) United States Patent (10) Patent No.: US 12,697,738 B2
Zhao et al. (45) Date of Patent: Aug. 4, 2026

(54) ROBOT, DRIVE MECHANISM, SPEED REDUCER, TORQUE SENSOR, AND TORQUE DETECTION METHOD

(71) Applicant: KABUSHIKI KAISHA YASKAWA DENKI, Kitakyushu (JP)

(72) Inventors: Fei Zhao, Kitakyushu (JP); Kumiko Toma, Kitakyushu (JP); Shinsuke Kuchiwano, Kitakyushu (JP); Eiji Fujitsu, Kitakyushu (JP); Satoshi Sueyoshi, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 344 days.

(21) Appl. No.: 18/515,474

(22) Filed: Nov. 21, 2023

(65) Prior Publication Data

US 2024/0083041 A1    Mar. 14, 2024

Related U.S. Application Data

(63) Continuation of application No. PCT/JP2021/020709, filed on May 31, 2021.

(51) Int. Cl.
B25J 13/08        (2006.01)
B25J 9/00         (2006.01)
B25J 9/16         (2006.01)

(52) U.S. Cl.
CPC ........... B25J 13/085 (2013.01); B25J 9/0009 (2013.01); B25J 9/1633 (2013.01)

(58) Field of Classification Search
CPC . B25J 13/085; G05B 2219/40599; G01L 3/08
See application file for complete search history.

(56) References Cited

U.S. PATENT DOCUMENTS 4,624,621 A * 11/1986 Murakami ........... B25J 17/0258
                                                      901/29
2002/0056326 A1* 5/2002 Gombert ................ G01L 5/166
                                                      73/862.046

(Continued)

FOREIGN PATENT DOCUMENTS

JP        2011-209099 A      10/2011
JP        2015-023167 A      2/2015

(Continued)

OTHER PUBLICATIONS

International Preliminary Report on Patentability and Written Opinion issued Dec. 14, 2023 in PCT/JP2021/020709 (submitting English translation only), 7 pages.

(Continued)

*Primary Examiner* — Dale Moyer

(74) *Attorney, Agent, or Firm* — Oblon, McClelland, Maier & Neustadt, L.L.P.

(57) ABSTRACT

A robot includes a speed reducer that increases a first torque output from a motor and outputs a second torque, a torque sensor including an output part that outputs the second torque output from the speed reducer, and a sensor part that detects at least a torque applied to the output part, and a damper that is positioned in a transmission path of the second torque from the speed reducer to the torque sensor and damps transmission of the second torque.

20 Claims, 15 Drawing Sheets

(56)                    References Cited

U.S. PATENT DOCUMENTS

| 2004/0232318 A1 * | 11/2004 | Kitamura ................ G01L 5/166 |
| | | 250/221 |
| 2011/0239788 A1 * | 10/2011 | Nagasaka .............. B25J 13/085 |
| | | 901/19 |
| 2017/0113346 A1 | 4/2017 | Nagata et al. |
| 2017/0136629 A1 * | 5/2017 | Nagata .................. G01L 5/0061 |
| 2020/0108514 A1 * | 4/2020 | Wang ........................ B25J 9/126 |
| 2020/0173869 A1 * | 6/2020 | Negishi .................. B25J 13/084 |
| 2020/0298276 A1 | 9/2020 | Kojima et al. |
| 2021/0116315 A1 | 4/2021 | Endo et al. |
| 2022/0244117 A1 | 8/2022 | Zhao et al. |

FOREIGN PATENT DOCUMENTS

| JP | 2016-008667 A | 1/2016 |
| JP | 2017-080841 A | 5/2017 |
| JP | 2017-193093 A | 10/2017 |
| JP | 2019-030923 A | 2/2019 |
| JP | 2020-003459 A | 1/2020 |
| JP | 2020-156015 A | 9/2020 |
| WO | WO 2019/021442 A1 | 1/2019 |
| WO | WO 2021/079464 A1 | 4/2021 |

OTHER PUBLICATIONS

International Search Report issued Jul. 6, 2021 in PCT/JP2021/020709 filed May 31, 2021, 6 pages.
Office Action issued Sep. 27, 2024, in corresponding Japanese Patent Application No. 2023-525173 (with English Translation), 8 pages.

* cited by examiner

FIG. 1 without damping part torque sensor output error time first system ———
second system — — —

FIG. 13 without damping part (average of two systems)

torque sensor output error time

Average of two systems _____

FIG. 14 with damping part torque sensor output error time first system ——
second system - - - - with damping part (average of two systems)

torque sensor output error time

Average of two systems

ROBOT, DRIVE MECHANISM, SPEED REDUCER, TORQUE SENSOR, AND TORQUE DETECTION METHOD

CROSS-REFERENCE TO RELATED APPLICATIONS

The present application is a bypass continuation of and claims the benefit of priority to International Application No. PCT/JP2021/020709, filed May 31, 2021. The entire contents of these applications are incorporated herein by reference.

BACKGROUND OF THE INVENTION

Field of the Invention

The present invention relates to a robot, a drive mechanism, a speed reducer, a torque sensor, and a torque detection method.

Description of Background Art

International Publication No. 2019/021442 describes a torque sensor. The entire contents of this publication are incorporated herein by reference.

SUMMARY OF THE INVENTION

According to one aspect of the present invention, a robot includes a speed reducer that increases a first torque output from a motor and outputs a second torque, a torque sensor including an output part that outputs the second torque output from the speed reducer, and a sensor part that detects at least a torque applied to the output part, and a damper that is positioned in a transmission path of the second torque from the speed reducer to the torque sensor and damps transmission of the second torque.

According to another aspect of the present invention, a torque sensor includes an inputter that inputs a torque output from a speed reducer, an outputter that outputs the torque input by the inputter, and a sensor part that detects at least a torque applied to the outputter. The inputter includes a damper that is formed as a part of the inputter and damps transmission of the torque from the speed reducer.

According to yet another aspect of the present invention, a torque detection method includes increasing a first torque output from a motor using a speed reducer to output a second torque, outputting the second torque output from the speed reducer using an outputter of a torque sensor, detecting at least a torque applied to the outputter using a sensor part of the torque sensor, and damping transmission of the second torque in a transmission path of the second torque from the speed reducer to the torque sensor.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is an external view illustrating an example of a structure of a robot according to an embodiment of the present invention;

FIG. 13 is a graph showing an example of measurement results of output errors of average values of outputs of the first system and outputs of the second system in the comparative example in which a damping part is not provided;

FIG. 14 is a graph showing an example of measurement results of output errors of the first system and output errors of the second system in an embodiment in which a damping part is provided;

DETAILED DESCRIPTION OF THE EMBODIMENTS

Figure 2:
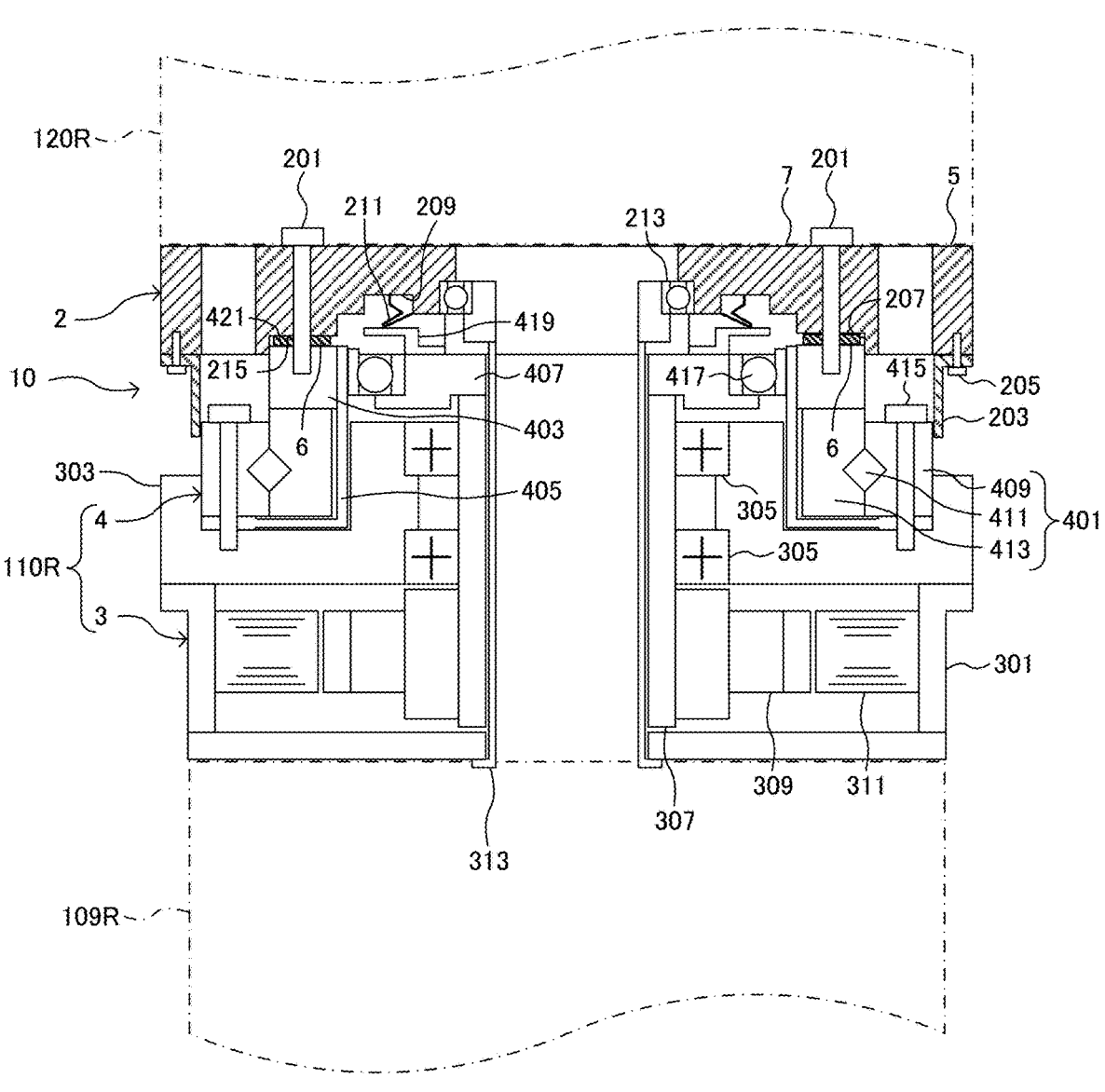
FIG. 2 is a cross-sectional view illustrating an example of a cross-sectional structure of a front end part of an arm of the robot.

Embodiments will now be described with reference to the accompanying drawings, wherein like reference numerals designate corresponding or identical elements throughout the various drawings.

Structure of Robot

Figure 1:
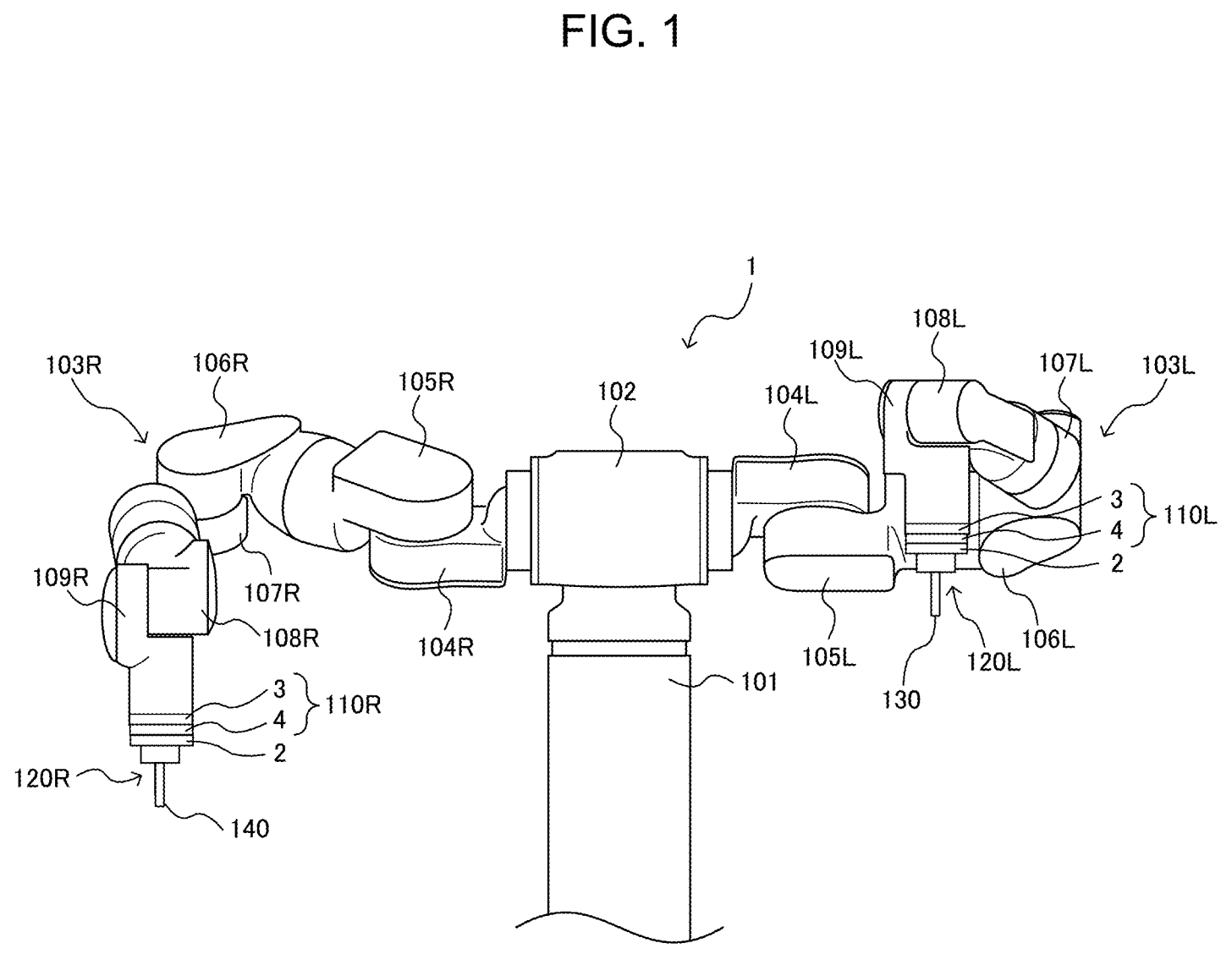

A structure of a robot 1 according to an embodiment of the present invention is described with reference to FIG. 1. As illustrated in FIG. 1, the robot 1 is a so-called dual-arm robot, and includes a base 101, a body part 102, and two separately structured arms (103L, 103R). The robot 1 is not necessarily a dual-arm robot but may be a robot with a single arm.

The base 101 is fixed to an installation surface of the robot 1 (for example, a floor surface), for example, using anchor bolts or the like. It is also possible that the base 101 is fixed to a surface other than a floor surface (for example, a ceiling surface, a wall surface, a frame, or the like). The body part 102 is pivotally supported on an upper end part of the base 101.

The arm (103L) is rotatably supported on a side part on one side of the body part 102. The arm (103L) includes a shoulder part (104L), an upper arm A part (105L), an upper arm B part (106L), a lower arm part (107L), a wrist A part (108L), a wrist B part (109L), and a torque sensor 2 as a flange part. In the present embodiment, a case is described where a torque sensor is provided in a flange part. However, it is also possible that torque sensors having a similar structure to the torque sensor 2 are provided in some or all of joint parts other than the flange part.

The shoulder part (104L) is rotatably supported on the side part on the one side of the body part 102. The shoulder part (104L) is driven to rotate with respect to the side part on the one side of the body part 102 by a drive of an actuator (not illustrated) provided in a joint part between the body part 102 and the shoulder part (104L).

The upper arm A part (105L) is pivotally supported on a front end side of the shoulder part (104L). The upper arm A part (105L) is driven to pivot with respect to the front end side of the shoulder part (104L) by a drive of an actuator (not illustrated) provided in a joint part between the shoulder part (104L) and the upper arm A part (105L).

The upper arm B part (106L) is rotatably supported on a front end side of the upper arm A part (105L). The upper arm B part (106L) is driven to rotate with respect to the front end side of the upper arm A part (105L) by a drive of an actuator (not illustrated) provided in a joint part between the upper arm A part (105L) and the upper arm B part (106L).

The lower arm part (107L) is pivotally supported on a front end side of the upper arm B part (106L). The lower arm part (107L) is driven to pivot with respect to the front end side of the upper arm B part (106L) by a drive of an actuator (not illustrated) provided in a joint part between the upper arm B part (106L) and the lower arm part (107L).

The wrist A part (108L) is rotatably supported on a front end side of the lower arm part (107L). The wrist A part (108L) is driven to rotate with respect to the front end side of the lower arm part (107L) by a drive of an actuator (not illustrated) provided in a joint part between the lower arm part (107L) and the wrist A part (108L).

The wrist B part (109L) is pivotally supported on a front end side of the wrist A part (108L). The wrist B part (109L) is driven to pivot with respect to the front end side of the wrist A part (108L) by a drive of an actuator (not illustrated) provided in a joint part between the wrist A part (108L) and the wrist B part (109L).

The torque sensor 2 is rotatably supported on a front end side of the wrist B part (109L). The torque sensor 2 is driven to rotate with respect to the front end side of the wrist B part (109L) by a drive of an actuator (110L) provided in a joint part between the wrist B part (109L) and the torque sensor 2. The actuator (110L) has a motor 3 and a speed reducer 4. Between the torque sensor 2 and the speed reducer 4, a damping part 6 (see FIGS. 2 and 3 below) is provided that damps transmission of a torque from the speed reducer 4 to the torque sensor 2.

A hand (120L) is attached to a front end side of the torque sensor 2. The hand (120L) rotates together with the torque sensor 2. The hand (120L) has a pair of claw members 130 that can move in a direction of approaching or distancing from each other.

On the other hand, the arm (103R) has a structure that is left-right symmetrical with respect to the above-described arm (103L) and is rotatably supported on a side part on the other side of the body part 102. The arm (103R) includes a shoulder part (104R), an upper arm A part (105R), an upper arm B part (106R), a lower arm part (107R), a wrist A part (108R), a wrist B part (109R), and a torque sensor 2 as a flange part. In the present embodiment, a case is described where a torque sensor is provided in a flange part. However, it is also possible that torque sensors having a similar structure to the torque sensor 2 are provided in some or all of joint parts other than the flange part.

The shoulder part (104R) is rotatably supported on the side part on the other side of the body part 102. The shoulder part (104R) is driven to rotate with respect to the side part on the other side of the body part 102 by a drive of an actuator (not illustrated) provided in a joint part between the body part 102 and the shoulder part (104R).

The upper arm A part (105R) is pivotally supported on a front end side of the shoulder part (104R). The upper arm A part (105R) is driven to pivot with respect to the front end side of the shoulder part (104R) by a drive of an actuator (not illustrated) provided in a joint part between the shoulder part (104R) and the upper arm A part (105R).

The upper arm B part (106R) is rotatably supported on a front end side of the upper arm A part (105R). The upper arm B part (106R) is driven to rotate with respect to the front end side of the upper arm A part (105R) by a drive of an actuator (not illustrated) provided in a joint part between the upper arm A part (105R) and the upper arm B part (106R).

The lower arm part (107R) is pivotally supported on a front end side of the upper arm B part (106R). The lower arm part (107R) is driven to pivot with respect to the front end side of the upper arm B part (106R) by a drive of an actuator (not illustrated) provided in a joint part between the upper arm B part (106R) and the lower arm part (107R).

The wrist A part (108R) is rotatably supported on a front end side of the lower arm part (107R). The wrist A part (108R) is driven to rotate with respect to the front end side of the lower arm part (107R) by a drive of an actuator (not illustrated) provided in a joint part between the lower arm part (107R) and the wrist A part (108R).

The wrist B part (109R) is pivotally supported on a front end side of the wrist A part (108R). The wrist B part (109R) is driven to pivot with respect to the front end side of the wrist A part (108R) by a drive of an actuator (not illustrated) provided in a joint part between the wrist A part (108R) and the wrist B part (109R).

The torque sensor 2 is rotatably supported on a front end side of the wrist B part (109R). The torque sensor 2 is driven to rotate with respect to the front end side of the wrist B part (109R) by a drive of an actuator (110R) provided in a joint part between the wrist B part (109R) and the torque sensor 2. The actuator (110R) has a motor 3 and a speed reducer 4. Between the torque sensor 2 and the speed reducer 4, a damping part 6 (see FIGS. 2 and 3 below) is provided that damps transmission of a torque from the speed reducer 4 to the torque sensor 2.

A hand (120R) is attached to a front end side of the torque sensor 2. The hand (120R) rotates together with the torque sensor 2. The hand (120R) has a pair of claw members 140 that can move in a direction of approaching or distancing from each other.

The above-described actuators each have, for example, a motor, a speed reducer, and the like. In the above, for distinction, rotation around a rotation axis along a longitudinal direction (or extension direction) of the arm (103L) or the arm (103R) is called "rotation," and rotation around a rotation axis substantially perpendicular to the longitudinal direction (or extension direction) of the arm (103L) or the arm (103R) is called "pivot."

In the above description, "perpendicular" does not mean "perpendicular" in a strict sense, and tolerances or errors that substantially occur are allowed. In the above description, "perpendicular" does not mean intersection of virtual axes, but also includes a case of torsional positions as long as directions of virtual axes intersect.

Structures of Torque Sensor, Motor, Speed Reducer, and Damping Part

Figure 3:
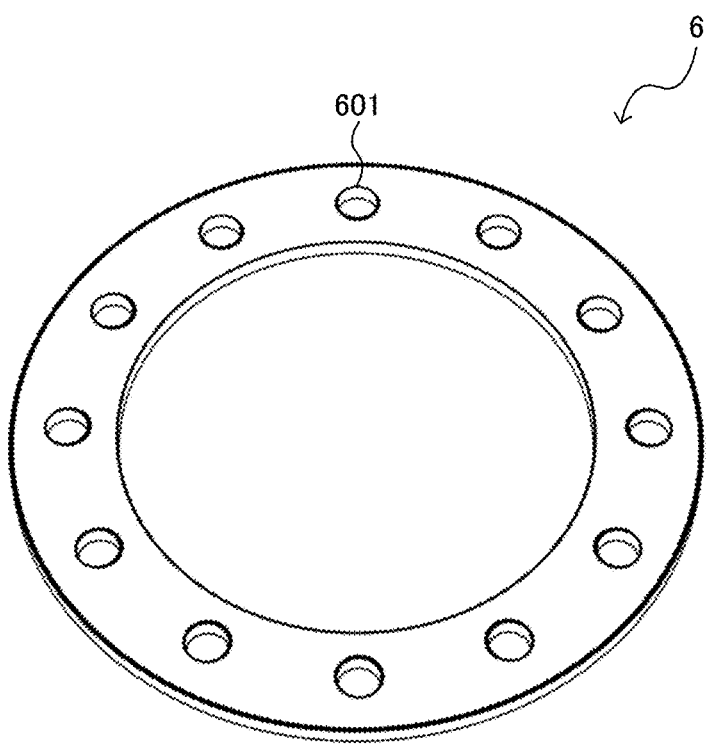
FIG. 3 is a perspective view illustrating an example of an external appearance of a damping part.

An example of structures of the torque sensor 2, the motor 3, the speed reducer 4, and the damping part 6 is described with reference to FIGS. 2 and 3. Since the structures of the torque sensor 2, the motor 3, the speed reducer 4, and the damping part 6 in both the arms (103L, 103R) are the same, the structures in the arm (103R) are described as an example. FIG. 2 is a cross-sectional view illustrating an example of a cross-sectional structure of a front end part of the arm (103R). FIG. 3 is a perspective view illustrating an example of an external appearance of the damping part 6. In FIG. 2, illustration of structures of a sensor part and the like of the torque sensor 2 is omitted.

As illustrated in FIG. 2, the hand (120R) is rotatably supported on the front end of the wrist B part (109R) of the arm (103R) via the motor 3, the speed reducer 4, and the torque sensor 2. The hand (120R) is driven to rotate by a drive of the actuator (110R) that has the motor 3 and the speed reducer 4. The hand (120R) rotates together with the torque sensor 2.

The motor 3 has a motor frame 301, a bracket 303, bearings 305, a motor shaft 307, a rotor 309, and a stator 311. The motor frame 301 and the bracket 303 are fixed by bolts (not illustrated) and are attached to the front end of the wrist B part (109R). For example, two bearings 305 are provided on an inner periphery of the bracket 303, allowing the motor shaft 307 in a hollow shape to protrude toward a base end side (opposite side with respect to the hand (120R); the same applies hereinafter), and rotatably support the motor shaft 307. The rotor 309 is provided on an outer periphery of the motor shaft 307, and is positioned opposing the stator 311, which is provided on an inner periphery of the motor frame 301, with a gap in a radial direction. The motor 3 drives the motor shaft 307 to rotate to output a first torque. On an inner side of the motor shaft 307, a cylindrical sleeve 313 fixed to the motor frame 301 is inserted, allowing wiring of a cable or the like on an inner side thereof.

The speed reducer 4 increases the first torque output from the motor 3 and outputs a second torque. The speed reducer 4 is, for example, a speed reducer having a wave gear mechanism. The speed reducer 4 has a sliding bearing 401, a circular spline 403, a flex spline 405, and a wave generator 407. The sliding bearing 401 has an outer ring 409, a sliding body 411, and an inner ring 413. The outer ring 409 is fixed to the bracket 303 of the motor 3 by bolts 415 together with the flex spline 405. The inner ring 413 is fixed to the circular spline 403 and is rotatably supported together with the circular spline 403 with respect to the outer ring 409 via the sliding body 411. An inner periphery side of the wave generator 407 is linked to the motor shaft 307 and rotates together with the motor shaft 307. The wave generator 407 is an example of a first input part that inputs the first torque output from the motor 3. When the wave generator 407 completes one rotation, since the flex spline 405 is fixed, the circular spline 403 moves in the same rotation direction as the wave generator 407 by a difference in the number of teeth between the circular spline 403 and the flex spline 405 (for example, 2). The circular spline 403 and the flex spline 405 are an example of a speed reducing part that increases the first torque input by the first input part. The circular spline 403 is an example of a first output part that outputs a second torque increased by the speed reducing part. The speed reducer 4 has a bearing cover 419 that covers a bearing 417 of the wave generator 407.

The torque sensor 2 has a ring-shaped outer peripheral part 5, a ring-shaped inner peripheral part 7, and a sensor part 8 (not illustrated in FIG. 2; see FIG. 4 below). The sensor part 8 is positioned between the outer peripheral part 5 and the inner peripheral part 7 and detects at least a torque applied to the outer peripheral part 5 based on a relative displacement between the outer peripheral part 5 and the inner peripheral part 7. The outer peripheral part 5 is fixed to the hand (120R) by multiple (12 in this example) bolts (not illustrated) inserted through bolt holes 11 (see FIG. 4 below). The inner peripheral part 7 is fixed to the circular spline 403 of the speed reducer 4 by multiple (12 in this example) bolts 201 inserted through bolt holes 13 (see FIG. 4 below). The inner peripheral part 7 is an example of a second input part that inputs the second torque output from the first output part. The outer peripheral part 5 is an example of an output part that outputs the second torque output from the speed reducer 4, or a second output part that outputs the second torque input by the second input part. The bolts 201 are an example of a fixing member that fixes the second input part to the first output part.

On a base end side of the outer peripheral part 5, a cylindrical seal member 203 protruding toward the speed reducer 4 side is fixed by bolts 205. The seal member 203 slides and performs sealing on an outer peripheral surface of the outer ring 409 of the sliding bearing 401 of the speed reducer 4 and prevents intrusion of water or dust.

A recess 207 is formed on an outer peripheral side of a base end side of the inner peripheral part 7. An outer peripheral surface of the circular spline 403 of the speed reducer 4 is fitted into the recess 207 and is positioned. A seal groove 209 is formed on an inner peripheral side of the base end side of the inner peripheral part 7. In the seal groove 209, a seal member 211 is provided that slides and performs sealing with respect to the bearing cover 419 of the speed reducer 4. On a further inner peripheral side of the seal groove 209, a bearing 213 is provided that rotatably supports the sleeve 313.

The damping part 6 is positioned in a transmission path of the second torque from the speed reducer 4 to the torque sensor 2, and damps transmission of the second torque. The damping part 6 is positioned in a transmission path of the second torque from the circular spline 403 of the speed reducer 4 to the inner peripheral part 7 of the torque sensor 2. The damping part 6 is interposed between the circular spline 403 and the inner peripheral part 7 and is a member that is formed separately from the speed reducer 4 and the torque sensor 2. The damping part 6 is interposed between a first transmission surface 421 of the circular spline 403 that transmits the second torque and a second transmission surface 215 of the inner peripheral part 7 that transmits the second torque. The second transmission surface 215 is formed on an inner side of the recess 207. The damping part 6 is interposed between the first transmission surface 421 and the second transmission surface 215 at a position fixed by the bolts 201. The damping part 6 is not particularly limited in material, shape, or the like, as long as the damping part 6 has a property of being capable of damping the transmission of the second torque from the speed reducer 4 to the torque sensor 2. For example, the damping part 6 may be an elastic shim member sandwiched between the first transmission surface 421 and the second transmission surface 215. In this case, there may be one or more shim members.

As the damping part 6, for example, a metal gasket formed of metal such as gold soft steel, pure iron, stainless steel, copper, aluminum, titanium, or a special alloy may be used. In this case, a damping structure excellent in sealing performance, heat resistance, and pressure resistance can be realized, and is suitable for a case where high-temperature and high-pressure conditions and high sealing performance are required. Further, as the damping part 6, for example, a member formed of a material containing resin or rubber may be used.

FIG. 3 illustrates an example of an external appearance of the damping part 6. As illustrated in FIG. 3, the damping part 6 is a ring-shaped plate member having a predetermined thickness. In the damping part 6, multiple (12 in this example) bolt holes 601 are formed through which the bolts 201 are inserted.

The speed reducer 4, the torque sensor 2, and the damping part 6 form a drive mechanism 10. The drive mechanism 10 executes a torque detection method that includes: outputting the second torque by increasing, by the speed reducer 4, the first torque output from the motor 3; outputting, by the outer peripheral part 5 of the torque sensor 2, the second torque output from the speed reducer 4; detecting, by the sensor part 8 of the torque sensor 2, at least a torque applied to the outer peripheral part 5; and damping the transmission of the second torque in the transmission path of the second torque from the speed reducer 4 to the torque sensor 2.

The structure of the drive mechanism 10 described above is an example, and the present invention is not limited to the content described above. For example, in the above description, in the speed reducer 4, the flex spline 405 is fixed with respect to the motor 3, and the circular spline 403 is an output part. However, conversely, it is also possible that the circular spline 403 is fixed with respect to the motor 3, and the flex spline 405 is an output part. For example, in the above description, in the torque sensor 2, the inner peripheral part 7 is linked to the speed reducer 4 and is an input part, and the outer peripheral part 5 is linked to the hand (120R) and is an output part. However, conversely, it is also possible that the outer peripheral part 5 is linked to the speed reducer 4 and is an input part, and the inner peripheral part 7 is linked to the hand (120R) and is an output part. For example, in the above description, the speed reducer 4 is a speed reducer having a wave gear mechanism. However, it is also possible that the speed reducer 4 is a speed reducer having a speed reducing mechanism other than a wave gear mechanism, such as a planetary gear mechanism.

Overall Structure of Torque Sensor

An example of an overall structure of the torque sensor 2 is described with reference to FIGS. 4 and 5. FIG. 4 is a plan view of the torque sensor 2 viewed from a positive direction side of a Z-axis, and FIG. 5 is a side view of the torque sensor 2 viewed from a negative direction side of a Y-axis.

Figures 4, 5:
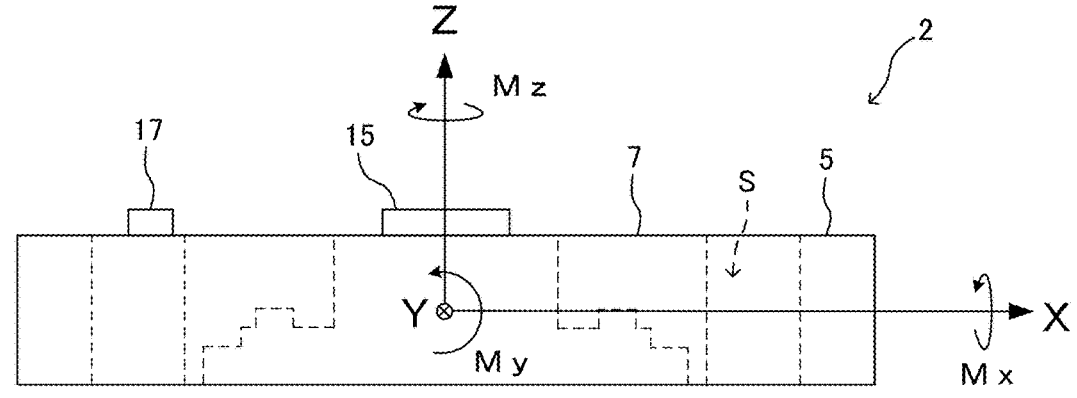
FIG. 4 is a plan view illustrating an example of a structure of a torque sensor viewed from a positive direction side of a Z-axis.
FIG. 5 is a side view illustrating an example of the structure of the torque sensor viewed from a negative direction side of a Y-axis.

As illustrated in FIGS. 4 and 5, the torque sensor 2 has the ring-shaped outer peripheral part 5, the ring-shaped inner peripheral part 7 that is positioned on an inner side of the outer peripheral part 5 in a radial direction and has a smaller diameter than the outer peripheral part 5, and multiple (4 in this example) linking parts (9A-9D) linking the outer peripheral part 5 and the inner peripheral part 7. It is also possible that the inner peripheral part 7 has a solid structure (such as a circular-plate-shaped member) instead of a hollow structure.

As illustrated in FIG. 4, the outer peripheral part 5 and the inner peripheral part 7 are positioned concentrically in the radial direction around the Z-axis. The outer peripheral part 5 is formed with the multiple (12 in this example) bolt holes 11 through which the multiple bolts (not illustrated) are inserted for fixing the outer peripheral part 5 to an external device such as the hand (120L) or the hand (120R). The bolt holes 11 are concentrated near the linking parts (9A-9D) such that, in a circumferential direction around the Z-axis, the bolt holes 11 are more densely positioned at positions corresponding to the lining parts (9A-9D) than at positions not corresponding to the linking parts (9A-9D). The inner peripheral part 7 is formed with the multiple (12 in this example) bolt holes 13 through which the multiple bolts 201 are inserted for fixing the inner peripheral part 7 to an external device such as the speed reducer 4. The bolt holes 13 are formed at substantially equal angular intervals (30-degree intervals in this example) in the circumferential direction around the Z-axis. It is also possible that, similar to the bolt holes 11, the bolt holes 13 are also concentrated near the linking parts (9A-9D). Further, it is also possible that, similar to the bolt holes 13, the bolt holes 11 are formed at substantially equal angular intervals in the circumferential direction around the Z-axis.

As illustrated in FIG. 5, the inner peripheral part 7 and the outer peripheral part 5 are formed to have substantially the same thickness in the Z-axis direction. The outer peripheral part 5 and the inner peripheral part 7 are formed such that their bottom surfaces (end surfaces on a negative direction side of the Z-axis) and top surfaces (end surfaces on the positive direction side of the Z-axis) are substantially flush with each other. It is also possible that the outer peripheral part 5 and the inner peripheral part 7 are formed to have different thicknesses.

The linking parts (9A-9D) are formed in a space (S) between the outer peripheral part 5 and the inner peripheral part 7 (see FIG. 5) at substantially equal angular intervals (90-degree intervals in this example) in the circumferential direction around the Z-axis. The linking parts (9A-9D) link the outer peripheral part 5 and the inner peripheral part 7 allowing them to slightly rotate relative to each other about the Z-axis by an amount corresponding to a magnitude of a torque (torsional moment (M) about the Z-axis) to be detected by the torque sensor 2. In the following, for convenience of description, of the space (S), a space between the linking parts (9A, 9B) in the circumferential direction is referred to as a space (S1), a space between the linking parts (9B, 9C) is referred to as a space (S2), a space between the linking parts (9C, 9D) is referred to as a space (S3), and a space between the linking parts (9D, 9A) is referred to as a space (S4). The number and positions of the linking parts may be other numbers and positions than those described above as long as the outer peripheral part 5 and the inner peripheral part 7 can be linked with a predetermined rigidity.

As illustrated in FIG. 4, multiple (4 in this example) substrate units (PB1-PB4) are positioned in the space (S) between the outer peripheral part 5 and the inner peripheral part 7. The substrate units (PB1-PB4) each have multiple substrates and are each structured as a set of substrates (see FIG. 7 below). The substrate units (PB1-PB4) are respectively positioned in the multiple spaces (S1-S4) between the multiple linking parts (9A-9D) in the circumferential direction around the Z-axis. That is, the substrate unit (PB1) is positioned in the space (S1), the substrate unit (PB2) is positioned in the space (S2), the substrate unit (PB3) is positioned in the space (S3), and the substrate unit (PB4) is positioned in the space (S4). The substrate unit (PB3) and the substrate unit (PB4) are respectively provided with external connectors (15, 17) for performing power input and signal transmission and reception with an external device.

Substrate units adjacent to each other in the circumferential direction, in this example, the substrate unit (PB4) and the substrate unit (PB1), the substrate unit (PB1) and the substrate unit (PB2), and the substrate unit (PB2) and the substrate unit (PB3), are respectively electrically connected to each other by connecting parts (19, 21, 23) across the linking parts (9A, 9B, 9C). The connecting parts (19, 21, 23) are each, for example, a flexible printed circuit (FPC). As long as the connecting parts can connect the substrates in a manner enabling signal transmission and reception between the substrates, in addition to FPCs, for example, lead wires, cables, connectors, and the like may also be used. Further, considering convenience of signal transmission and reception, it is also possible to use four FPCs for electrical connection across the linking parts (9A, 9B, 9C, 9D).

In the present embodiment, of axes perpendicular to the Z-axis, an axis of a direction passing through a substantially center position of the substrate unit (PB2) (a direction that bisects the angular interval between the linking parts (9B, 9C)) in the circumferential direction is the X-axis, and an axis of a direction perpendicular to the X-axis, that is, a direction passing through a substantially center position of the substrate unit (PB1) (a direction that bisects the angular interval between the linking parts (9A, 9B)) in the circumferential direction is the Y-axis.

Structures of Outer Peripheral Part, Inner Peripheral Part, and Linking Parts

Figure 6:
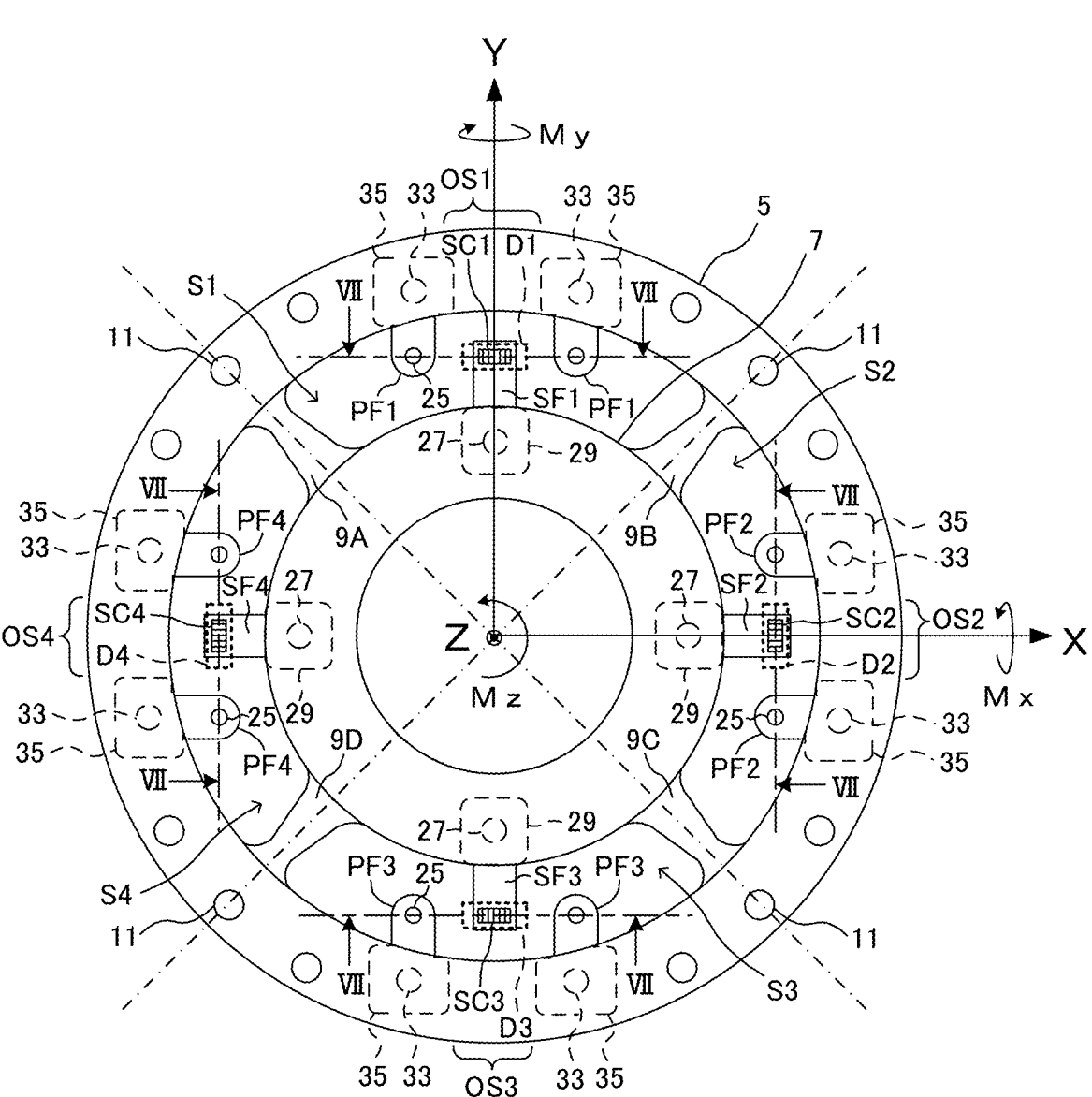
FIG. 6 is a plan view of the structures of an outer peripheral part, an inner peripheral part, linking parts of the torque sensor viewed from the positive direction side of the Z-axis.

An example of structures of the outer peripheral part 5, the inner peripheral part 7, the linking parts (9A-9D), and the like of the torque sensor 2 is described with reference to FIG. 6. FIG. 6 is a plan view of the structures of the outer peripheral part 5, the inner peripheral part 7, the linking parts (9A-9D), and the like viewed from the positive direction side of the Z-axis. FIG. 6 illustrating a state in which the substrate units (PB1-PB4), the connecting parts (19, 21, 23), and the like have been removed from the torque sensor 2 illustrated in FIG. 4. Further, in FIG. 6, illustration of the bolt holes 13 of the inner peripheral part 7 is omitted to avoid complication. Further, in FIG. 6, to show positional relationship with scales (SC1-SC4), detectors (D1-D4) provided in the substrate units (PB1-PB4) are indicated using dashed lines.

As illustrated in FIG. 6, the outer peripheral part 5 and the inner peripheral part 7 are linked by the linking parts (9A-9D), and the linking parts (9A-9D) are formed at substantially 90-degree intervals in the circumferential direction. The inner peripheral part 7 has multiple (4 in this example) scale fixing parts (SF1-SF4) protruding radially outward in the space (S). The scale fixing parts (SF1-SF4) are formed at substantially 90-degree intervals in the circumferential direction. The scales (SC1-SC4) are respectively fixed on upper surfaces of the scale fixing parts (SF1-SF4), for example, using screws (not illustrated).

Although not illustrated, the scales (SC1-SC4) each have multiple reflection slits formed in the circumferential direction.

The scale fixing part (SF1) protrudes in a positive direction of the Y-axis and positions the scale (SC1) in a middle position between two fixing positions (pin holes (25, 25) of substrate fixing parts (PF1, PF1) to be described later) of the substrate unit (PB1) in the circumferential direction. The scale fixing part (SF2) protrudes in a positive direction of the X-axis and positions the scale (SC2) in a middle position between two fixing positions (pin holes (25, 25) of substrate fixing parts (PF2, PF2) to be described later) of the substrate unit (PB2) in the circumferential direction. The scale fixing part (SF3) protrudes in a negative direction of the Y-axis and positions the scale (SC3) in a middle position between two fixing positions (pin holes (25, 25) of substrate fixing parts (PF3, PF3) to be described later) of the substrate unit (PB3) in the circumferential direction. The scale fixing part (SF4) protrudes in a negative direction of the X-axis and positions the scale (SC4) in a middle position between two fixing positions (pin holes (25, 25) of substrate fixing parts (PF4, PF4) to be described later) of the substrate unit (PB4) in the circumferential direction.

The scale fixing parts (SF1-SF4) are each structured as a separate piece from the inner peripheral part 7. The scale fixing parts (SF1-SF4) each have a base part 29 where a bolt hole 27 is formed. The base part 29 is detachably attached to a fixing site of the inner periphery part 7 (for example, a recess formed on a bottom surface side) using a fixing bolt (not illustrated) inserted through the bolt hole 27. As a result, the scale fixing parts (SF1-SF4) are each detachably fixed to the inner peripheral part 7. It is also possible that the scale fixing parts (SF1-SF4) and the inner peripheral part 7 are integrally formed. Further, it is also possible that the scale fixing parts (SF1-SF4) are connected to form a single piece.

The outer peripheral part 5 has multiple sets (4 sets in this example) of substrate fixing parts (PF1-PF4) protruding inward in the space (S). The sets of the substrate fixing parts (PF1-PF4), that is, the set of substrate fixing parts (PF1, PF1), the set of substrate fixing parts (PF2, PF2), the set of substrate fixing parts (PF3, PF3), and the set of substrate fixing parts (PF4, PF4), are formed at substantially 90-degree intervals in the circumferential direction. The substrate fixing parts (PF1, PF1) are formed so as to sandwich the scale fixing part (SF1) in the circumferential direction, the substrate fixing parts (PF2, PF2) are formed so as to sandwich the scale fixing part (SF2) in the circumferential direction, the substrate fixing parts (PF3, PF3) are formed so as to sandwich the scale fixing part (SF3) in the circumferential direction, and the substrate fixing parts (PF4, PF4) are formed so as to sandwich the scale fixing part (SF4) in the circumferential direction. On upper surfaces of the sets of substrate fixing parts (PF1-PF4), the substrate units (PB1-PB4) that respectively have the detectors (D1-D4) are each fixed at multiple (2 in this example) fixing positions by stud pins (31, 31) (see FIG. 7 below).

The substrate fixing parts (PF1, PF1) protrude in the negative direction of the Y-axis and are respectively formed with pin holes 25 into which the stud pins 31 for fixing the substrate unit (PB1) are press-fitted. The substrate fixing parts (PF1, PF1) fix the substrate unit (PB1) such that the detector (D1) is positioned to face the scale (SC1) in the Z-axis direction at a middle position between the two fixing positions (pin holes (25, 25)) of the substrate unit (PB1) in the circumferential direction. The substrate fixing parts (PF2, PF2) protrude in the negative direction of the X-axis and are respectively formed with pin holes 25 into which the stud pins 31 for fixing the substrate unit (PB2) are press-fitted. The substrate fixing parts (PF2, PF2) fix the substrate unit (PB2) such that the detector (D2) is positioned to face the scale (SC2) in the Z-axis direction at a middle position between the two fixing positions (pin holes (25, 25)) of the substrate unit (PB2) in the circumferential direction.

The substrate fixing parts (PF3, PF3) protrude in the positive direction of the Y-axis and are respectively formed with pin holes 25 into which the stud pins 31 for fixing the substrate unit (PB3) are press-fitted. The substrate fixing parts (PF3, PF3) fix the substrate unit (PB3) such that the detector (D3) is positioned to face the scale (SC3) in the Z-axis direction at a middle position between the two fixing positions (pin holes (25, 25)) of the substrate unit (PB3) in the circumferential direction. The substrate fixing parts (PF4, PF4) protrude in the positive direction of the X-axis and are respectively formed with pin holes 25 into which the stud pins 31 for fixing the substrate unit (PB4) are press-fitted. The substrate fixing parts (PF4, PF4) fix the substrate unit (PB4) such that the detector (D4) is positioned to face the scale (SC4) in the Z-axis direction at a middle position between the two fixing positions (pin holes (25, 25)) of the substrate unit (PB4) in the circumferential direction.

The substrate fixing parts (PF1-PF4) are each structured as a separate piece from the outer peripheral part 5. The substrate fixing parts (PF1-PF4) each have a base part where a bolt hole 33 is formed. The base part 35 is detachably attached to a fixing site of the outer peripheral part 5 (for example, a recess formed on a bottom surface side) using a fixing bolt (not illustrated) inserted through the bolt hole 33. As a result, the substrate fixing parts (PF1-PF4) are each detachably fixed to the outer peripheral part 5. It is also possible that the substrate fixing parts (PF1-PF4) and the outer peripheral part 5 are integrally formed.

The structure described above is an example, and the present invention is not limited to this. For example, it is also possible that the scale fixing parts (SF1-SF4) are provided on the outer peripheral part 5, the scales (SC1-SC4) are fixed to the outer peripheral part 5, the substrate fixing parts (PF1-PF4) are provided on the inner peripheral part 7, and the detectors (D1-D4) are fixed to the inner peripheral part 7.

Structure of Each Substrate Unit

Figure 7:
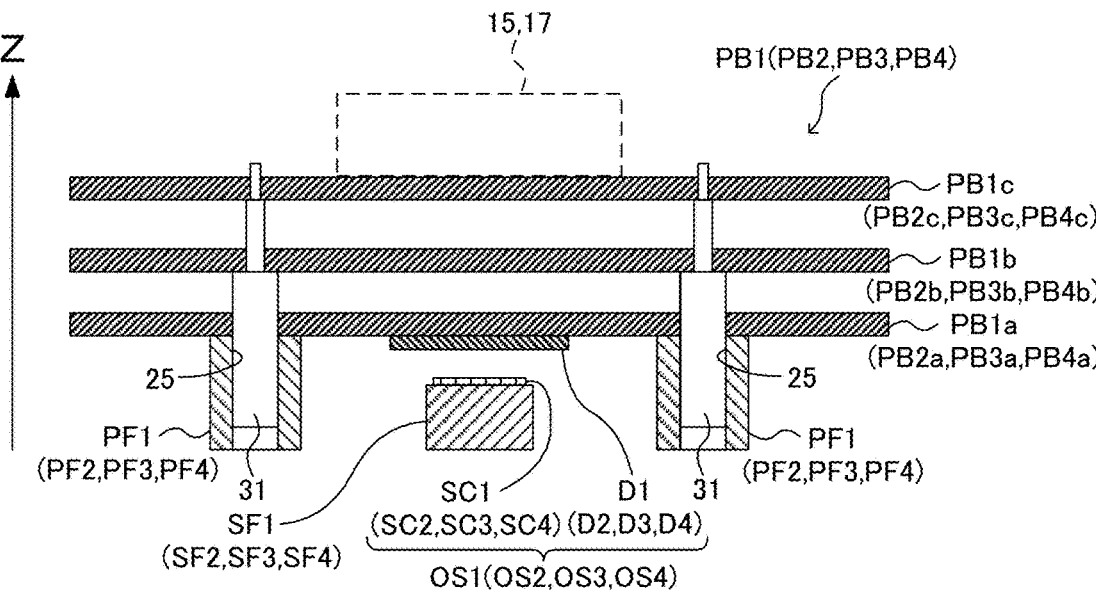
FIG. 7 is a cross-sectional view illustrating an example of a cross-sectional structure of substrates along a VII-VII cross-sectional line in FIG. 4.

An example of a structure of each of the substrate units (PB1-PB4) is described with reference to FIG. 7. FIG. 7 is a cross-sectional view illustrating an example of a cross-sectional structure of each of the substrate units (PB1-PB4) along a VII-VII cross-sectional line in FIG. 4 (also illustrated for reference in FIG. 6). In FIG. 7, illustration of the connecting parts (19, 21, 23) and circuit components on the substrates is omitted.

Since the substrate units (PB1-PB4) have the same substrate structure, here the substrate unit (PB1) is described as an example. As illustrated in FIG. 7, The substrate unit (PB1) has multiple (3 in this example) substrates (PB1*a*-PB1*c*). The substrates (PB1*a*-PB1*c*) have substantially the same shape and are positioned in multiple stages in the Z-axis direction. The substrates (PB1*a*-PB1*c*) are supported with predetermined gaps between them in the Z-axis direction by the substrate fixing parts (PF1, PF1) and the stud pins (31, 31) press-fitted into them. The substrates (PB1*a*-PB1*c*) are positioned in the order of the substrates (PB1*a*, PB1*b*, PB1*c*) from the negative direction side to the positive direction side of the Z-axis.

The substrate (PB1*a*) is a substrate that mainly performs signal processing of analog signals. On a lower surface (surface on the negative direction side of the Z-axis) of the substrate (PB1*a*), the detector (D1) is positioned so as to face the scale (SC1) fixed to the scale fixing part (SF1) with a predetermined gap in the Z-axis direction. The detector (D1) and the scale (SC1) form a first optical sensor (OS1), which detects a relative displacement between the outer peripheral part 5 and the inner peripheral part 7. The substrate (PB1*a*) is provided with a circuit for amplification of an analog signal output from the detector (D1), a circuit for offset removal, and the like.

The substrate (PB1*b*) is a substrate that mainly performs signal processing of digital signals. The substrate (PB1*b*) is provided with an A/D conversion circuit, an arithmetic circuit that functions as a torque calculation part 37 (to be described later), a power supply monitoring processing circuit, and the like. Functions of these circuits may be implemented by a program executed by a CPU, or some or all of the functions may be implemented by an actual device such as an ASIC or FPGA, or other electrical circuits.

The substrate (PB1*c*) is a substrate that mainly performs processing related to a communication function. The substrate (PB1*c*) is provided with a power supply circuit, a communication circuit for transmitting and receiving signals to or from other devices or substrates, and the like. The substrate unit (PB3) and the substrate unit (PB4) are respectively provided with the above-described external connectors (15, 17) (illustrated using a dashed line in FIG. 7) on upper surfaces (surfaces on the positive direction side of the Z-axis) of the substrate (PB3*c*) and the substrate (PB4*c*).

The other substrate units (PB2-PB4) have the same substrate structure as the above-described substrate unit (PB1) and thus, a description thereof is omitted. The scale (SC2) fixed to the scale fixing part (SF2) and the detector (D2) positioned on the substrate (PB2*a*) of the substrate unit (PB2) form a second optical sensor (OS2). Similarly, the scale (SC3) fixed to the scale fixing part (SF3) and the detector (D3) positioned on the substrate (PB3*a*) of the substrate unit (PB3) form a third optical sensor (OS3). Similarly, the scale (SC4) fixed to the scale fixing part (SF4) and the detector (D4) positioned on the substrate (PB4*a*) of the substrate unit (PB4) form a fourth optical sensor (OS4). The sensor part 8 has the first optical sensor (OS1), the second optical sensor (OS2), the third optical sensor (OS3), and the fourth optical sensor (OS4).

The substrate structure of the substrate units (PB1-PB4) described above is an example, and the present invention is not limited to this. For example, when the functions of the substrates described above can be implemented on a single substrate, the substrate units (PB1-PB4) may each be formed of a single substrate. Further, when processing is divided among multiple substrates, it is not limited to the example described above in which the processing is divided into analog signal processing, digital signal processing, and communication processing. For example, the processing may be divided among an even smaller number of substrates (for example, two substrates), or the functions may be further subdivided and the processing is divided among an even larger number of substrates (4 or more substrates). Further, it is also possible that the substrate units are extended along the circumference to form a ring-shaped substrate and to have a structure without connecting parts such as FPCs.

Structure of Detector

Figure 8:
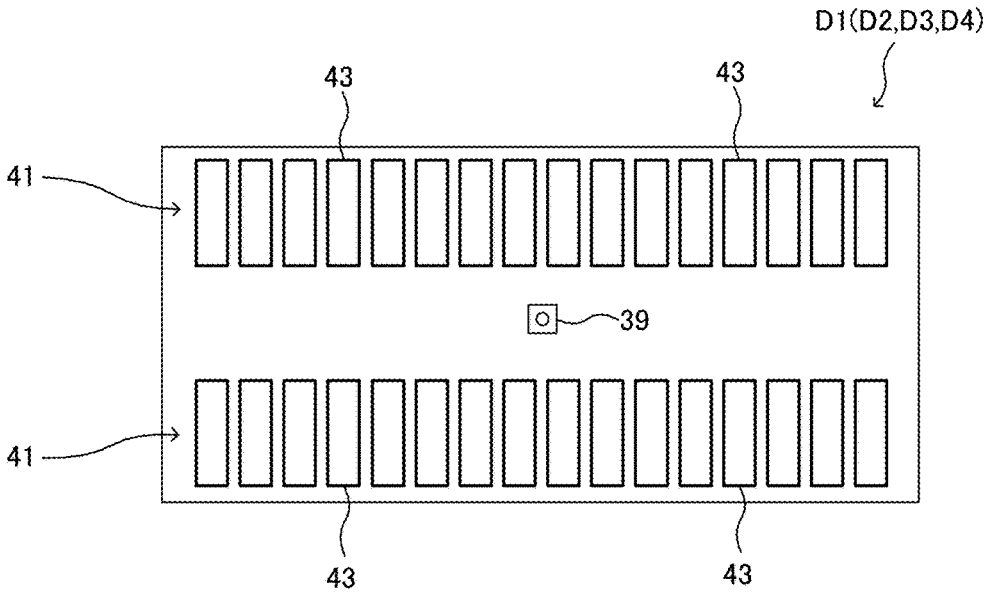
FIG. 8 is a plan view illustrating an example of a structure of a detector viewed from a negative direction side of the Z-axis.

An example of a structure of each of the detectors (D1-D4) is described with reference to FIG. 8. FIG. 8 is a plan view of each of the detectors (D1-D4) viewed from the negative direction side of the Z-axis.

Since the detectors (D1-D4) have the same structure, here the detector (D1) is described as an example. As illustrated in FIG. 8, the detector (D1) has a light source 39 and two light receiving parts 41 positioned to sandwich the light source 39 in the radial direction about the Z-axis.

The light source 39 emits light to the scale (SC1). The light source 39 is not particularly limited as long as it is a light source capable of emitting light to an irradiation region. For example, as the light source 39, an LED (Light Emitting Diode) can be used. The light source 39 is structured as a point light source in which an optical lens or the like is not particularly positioned and emits diffused light. By using a point light source, the light source 39 can substantially evenly emit light to the scale (SC1) positioned at a position opposing the light source 39. Further, since focusing or diffusing using an optical element is not performed, an error or the like due to an optical element is unlikely to occur, and it is possible to improve directness of light to the scale (SC1).

The light receiving parts 41 each have multiple (16 in this example) light receiving elements 43 positioned at equal intervals along the circumferential direction around the Z-axis. The multiple light receiving elements 43 are formed to have an incremental pattern. The number of the light receiving elements 43 forming each of the light receiving parts 41 may be different from the above example.

The first optical sensor (OS1) emits light from the light source 39 of the detector (D1) to the scale (SC1), and receives light reflected by the scale (SC1) with the light receiving elements 43 of the light receiving parts 41. As a result, the first optical sensor (OS1) detects a relative rotation amount between the outer peripheral part 5 and the inner peripheral part 7 and transmits the rotation amount to the torque calculation part 37 (see FIG. 10 below).

The other detectors (D2-D4) have the same structure as the above-described detector (D1) and thus, a description thereof is omitted. In the same manner as described above, the second optical sensor (OS2), the third optical sensor (OS3), and the fourth optical sensor (OS4) also each detect a relative rotation amount between the outer peripheral part 5 and the inner peripheral part 7 and transmit the rotation amount to the torque calculation part 37. The torque calculation part 37 calculates a value of a torque acting between the outer peripheral part 5 and the inner peripheral part 7 based on the rotation amounts received from the optical sensors (OS1-OS4), elastic moduli of the linking parts (9A-9D), and the like.

The structure of the detector (D1) described above is an example, and the present invention is not limited to this. For example, in the above, the two light receiving parts 41 are positioned so as to sandwich the light source 39 in the radial direction. However, it is also possible that the two light receiving parts are positioned so as to sandwich the light source 39 in the circumferential direction.

Overall Structure of Substrate Units

Figure 9:
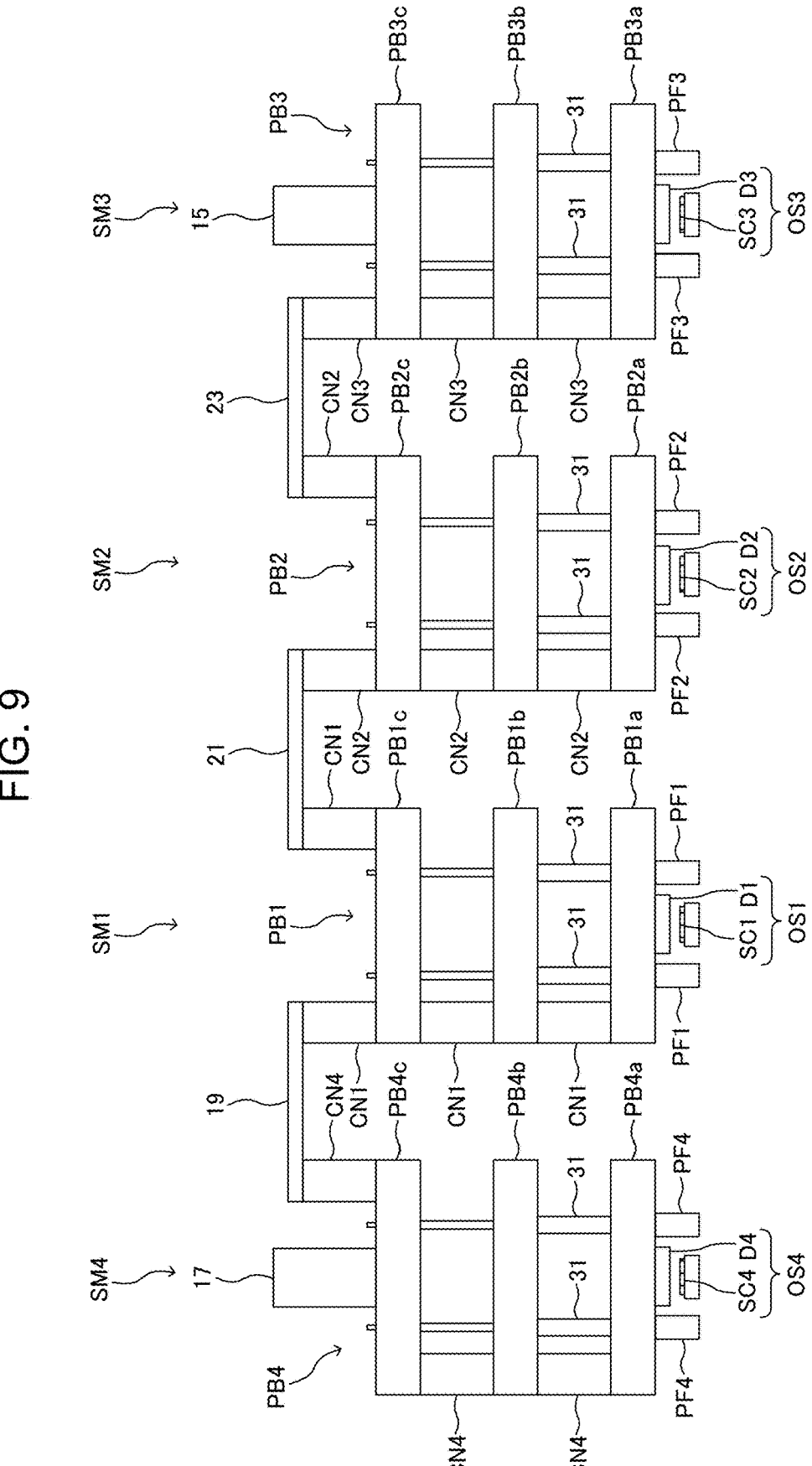
FIG. 9 is an explanatory diagram conceptually illustrating an example of an overall structure of substrates of the torque sensor.

An example of an overall structure of the substrate units (PB1-PB4) of the torque sensor 2 is described with reference to FIG. 9. FIG. 9 is an explanatory diagram conceptually illustrating an example of the overall structure of the substrate units (PB1-PB4) of the torque sensor 2.

As illustrated in FIG. 9, the torque sensor 2 has the four substrate units (PB1-PB4). The substrates (PB1a-PB1c) that form the substrate unit (PB1) are connected by stacking connectors (CN1) to enable transmission and reception of power and signals between them. The substrates (PB2a-PB2c) that form the substrate unit (PB2) are connected by stacking connectors (CN2) to enable transmission and reception of power and signals between them. The substrates (PB3a-PB3c) that form the substrate unit (PB3) are connected by stacking connectors (CN3) to enable transmission and reception of power and signals between them. The substrates (PB4a-PB4c) that form the substrate unit (PB4) are connected by stacking connectors (CN4) to enable transmission and reception of power and signals between them.

The substrate (PB4c) and the substrate (PB1c) are connected by the connecting part 19 via stacking connectors (CN4, CN1) to enable transmission and reception of power and signals between them. The substrate (PB1c) and the substrate (PB2c) are connected by the connecting part 21 via stacking connectors (CN1, CN2) to enable transmission and reception of power and signals between them. The substrate (PB2c) and the substrate (PB3c) are connected by the connecting part 23 via stacking connectors (CN2, CN3) to enable transmission and reception of power and signals between them. The substrate (PB4c) is provided with the external connector 17 for performing power input and signal transmission and reception with an external device, and the substrate (PB3c) is provided with the external connector 15 for performing power input and signal transmission and reception with an external device.

In the following, for convenience of description, the substrate unit (PB1) and the first optical sensor (OS1) are referred to as a first sensor module (SM1), the substrate unit (PB2) and the second optical sensor (OS2) are referred to as a second sensor module (SM2), the substrate unit (PB3) and the third optical sensor (OS3) are referred to as a third sensor module (SM3), and the substrate unit (PB4) and the fourth optical sensor (OS4) are referred to as a fourth sensor module (SM4).

The first sensor module (SM1) and the third sensor module (SM3) positioned at a 180-degree angular interval in the circumferential direction form a first system, where the third sensor module (SM3) functions as a master and the first sensor module (SM1) functions as a slave. The second sensor module (SM2) and the fourth sensor module (SM4) positioned at a 180-degree angular interval in the circumferential direction form a second system, where the fourth sensor module (SM4) functions as a master and the second sensor module (SM2) functions as a slave.

In the first system, the first sensor module (SM1) transmits a detection value of the first optical sensor (OS1) to the third sensor module (SM3) via the second sensor module (SM2), and the third sensor module (SM3) adds the received detection value of the first optical sensor (OS1) to a detection value of the third optical sensor (OS3) to calculate an average value. In the second system, the second sensor module (SM2) transmits a detection value of the second optical sensor (OS2) to the fourth sensor module (SM4) via the first sensor module (SM1), and the fourth sensor module (SM4) adds the received detection value of the second optical sensor (OS2) to a detection value of the fourth optical sensor (OS4) to calculate an average value. When only cancellation of a detection error due to cross-axis interference (details to be described later) is performed, the third sensor module (SM3) calculates a torque value using the average value calculated above and transmits the torque value to outside via the external connector 15. Further, the fourth sensor module (SM4) calculates a torque value using the average value calculated above and transmits the torque value to outside via the external connector 17.

On the other hand, in a case where cancellation of a detection error due to torque ripple when the torque sensor 2 is used in conjunction with a speed reducer of a wave gear mechanism is further performed (details to be described later) in addition to performing cancellation of a detection error due to cross-axis interference, for example, the following processes are taken. That is, one of the third sensor module (SM3) and the fourth sensor module (SM4) transmits the above-described calculated average value to the other sensor module, and the other sensor module receiving the average value adds these average values to further calculate an average value. Then, a torque value is calculated using the calculated average value, and the calculation result is transmitted to the outside via the external connector 15 or the external connector 17.

In the above, the calculation of the average value in each system is performed by the master. However, the present invention is not limited to this. For example, it is also possible that the calculation of the average values in the systems is performed by the slaves, and these average values are transmitted to the master of one of the systems and this master calculates a torque value by calculating an average of the average values. Further, for example, it is also possible that the calculation of the average value in one of the systems is performed by the master, and the calculation of the average value in the other system is performed by the slave and this average value is transmitted from this slave to the master of the one of the systems, and this master calculates a torque value by calculating an average of the average values.

As described above, since transmission and reception of signals and the like between the master and the slave in one of the systems are performed via the slave in the other system, wirings can be simplified compared to a case where the master and the slave of each system are directly connected. Further, since the third sensor module (SM3) and the fourth sensor module (SM4) are not connected, this further promotes wiring reduction or simplification.

The substrate structure described above is an example, and the present invention is not limited to this. For example, it is also possible that the third sensor module (SM3) and the fourth sensor module (SM4) are connected with a connecting part, and the substrate units (PB1-PB4) are connected in a ring shape. Further, for example, it is also possible that an external connector is provided in the slave instead of or in addition to the master in each system or is provided in at least one of the master and slave of only one of the systems.

Torque Calculation Processing

Figure 10:
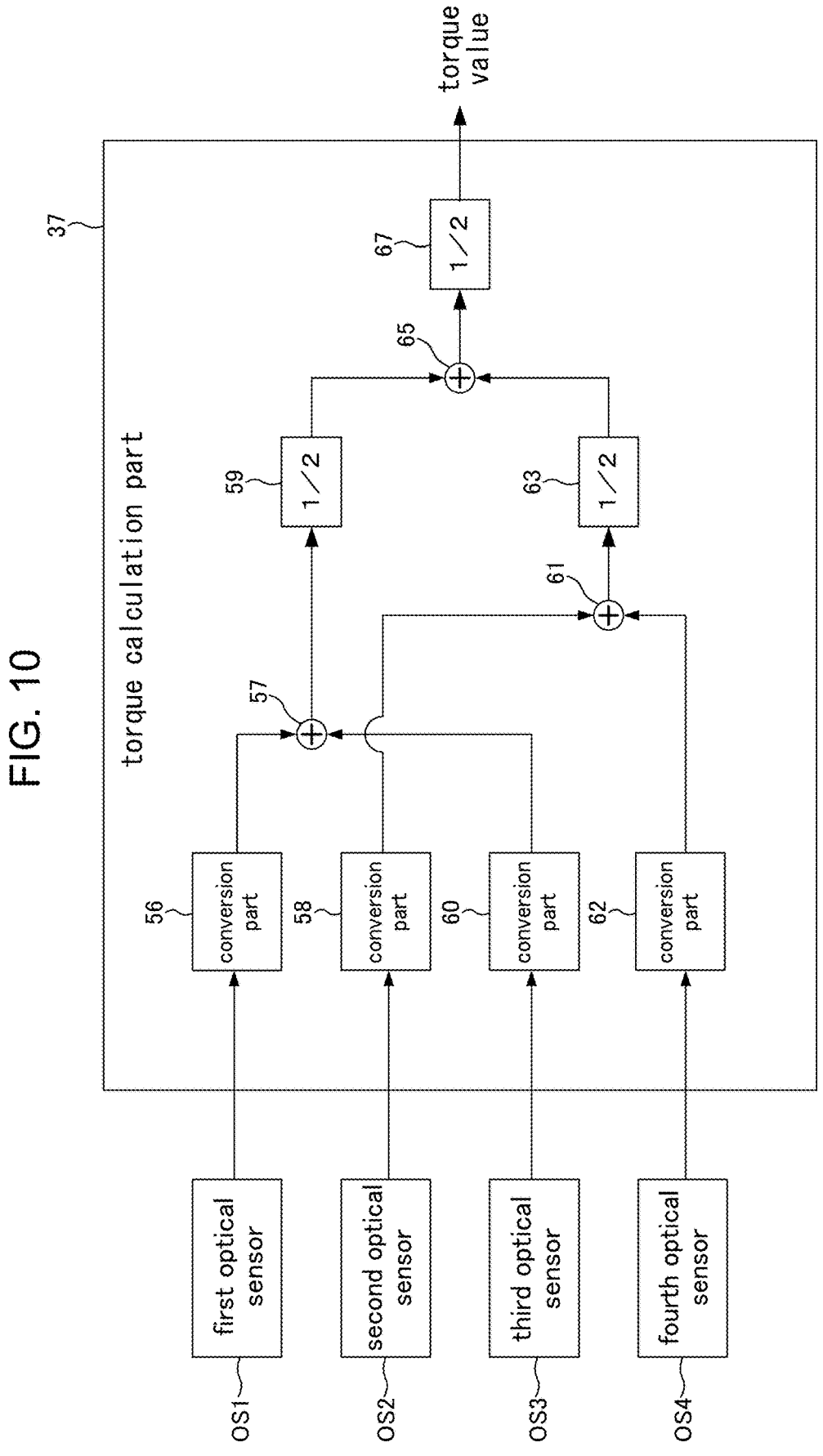
FIG. 10 is a block diagram illustrating an example of a functional structure of a torque calculation part that executes torque calculation processing.

An example of torque calculation processing is described with reference to FIG. 10. FIG. 10 is a block diagram illustrating an example of a functional structure of the torque calculation part 37 that executes the torque calculation processing. The processing executed by the torque calculation part 37 illustrated in FIG. 10 may be divided among all or some of the substrates (PB1b, PB2b, PB3b, PB4b) or may be executed by only one specific substrate.

The torque calculation part 37 calculates a torque value based on outputs from multiple optical sensors (the four optical sensors (OS1-OS4) in this example). As illustrated in FIG. 10, the torque calculation part 37 has conversion parts (56, 58, 60, 62), an addition part 57, a division part 59, an addition part 61, a division part 63, an addition part 65, and a division part 67.

The conversion parts (56, 58, 60, 62) each calculate a value of a torque acting between the outer peripheral part 5 and the inner peripheral part 7 based on outputs (detection values) of the first optical sensor (OS1), the second optical sensor (OS2), the third optical sensor (OS3), and the fourth optical sensor (OS4), the elastic moduli of the linking parts (9A-9D), and the like.

The addition part 57 adds a torque value calculated by the conversion part 56 and a torque value calculated by the conversion part 60. The division part 59 divides a torque value added by the addition part 57 by 2 to calculate an average value.

The addition part 61 adds a torque value calculated by the conversion part 58 and a torque value calculated by the conversion part 62. The division part 63 divides a torque value added by the addition part 61 by 2 to calculate an average value.

As described above, by adding the outputs of the optical sensors (OS1, OS3) positioned at an 180-degree interval in the circumferential direction (including the torque values calculated by the conversion parts) and adding the outputs of the optical sensors (OS2, OS4) positioned at an 180-degree interval in the circumferential direction (including the torque values calculated by the conversion parts), detection errors doe to cross-axis interference can be canceled. Here, "cross-axis interference" refers to a torsional moment (Mx) around the X-axis, a torsional moment (My) around the Y-axis, and translational forces (Fx, Fy, Fz) in the X, Y and Z directions. Between the outer peripheral part 5 and the inner peripheral part 7 of the torque sensor 2, in addition to rotation around the Z-axis due to a torque (torsional moment (Mz) about the Z-axis), which is to be detected, relative rotation around the X-axis or the Y-axis due to a disturbance force (torsional moment (Mx, My)) other than a torque may occur. Further, relative movement in the X-, Y-, or Z-direction due to a disturbance force (translational force (Fx, Fy, Fz)) other than a torque may occur.

For example, when relative rotation around the X-axis occurs between the outer peripheral part 5 and the inner peripheral part 7, in the optical sensors (OS1, OS3) that form the first system, distances between the scales (SC1, SC3) and the detectors (D1, D3) vary. However, since a parallel positional relationship with respect to the circumferential direction around the Z-axis is maintained, a change in detection position (rotation amount) in the circumferential direction around the Z-axis is zero or very small. Therefore, influence on torque detection accuracy is negligible. On the other hand, in the optical sensors (OS2, OS4) that form the second system, since inclination with respect to the circumferential direction around the Z-axis occurs between the scales (SC2, SC4) and the detectors (D2, D4), a change in detection position in the circumferential direction occurs causing a detection error. However, in the optical sensors (OS2, OS4), since detection errors occur in opposite directions (positive direction and negative direction) in the circumferential direction around the Z-axis, by adding the outputs of the optical sensors (OS2, OS4), detection errors due to a torsional moment (Mx) can be canceled.

Similarly, when relative rotation around the Y-axis occurs between the outer peripheral part 5 and the inner peripheral part 7, influence on torque detection accuracy is negligible in the optical sensors (OS2, OS4) that form the second system. On the other hand, in the optical sensors (OS1, OS3) that form the first system, since inclination with respect to the circumferential direction around the Z-axis occurs between the scales (SC1, SC3) and the detectors (D1, D3), a change in detection position in the circumferential direction occurs causing a detection error. However, in the optical sensors (OS1, OS3), since detection errors occur in opposite directions (positive direction and negative direction) in the circumferential direction around the Z-axis, by adding the outputs of the optical sensors (OS1, OS3), detection errors due to a torsional moment (My) can be canceled.

When relative rotation around an axis other than the X-axis and the Y-axis in the XY plane occurs between the outer peripheral part 5 and the inner peripheral part 7, in the first system, as described above, for a component around the X-axis, influence on torque detection accuracy is negligible; and for a component around the Y-axis, a detection error can be canceled by adding the outputs of the optical sensors (OS1, OS3). Further, in the second system, as described above, for a component around the Y-axis, influence on torque detection accuracy is negligible; and for a component around the X-axis, a detection error can be canceled by adding the outputs of the optical sensors (OS2, OS4). Therefore, by adding the outputs of the optical sensors (OS1, OS3) and adding the outputs of the optical sensors (OS2, OS4), the torque sensor 2 can cancel a detection error even when relative rotation occurs around any axis in the XY plane.

Further, for example, when relative movement in the X-axis direction occurs between the outer peripheral part 5 and the inner peripheral part 7, in the optical sensors (OS2, OS4) that form the second system, since a change in detection position (rotation amount) in the circumferential direction around the Z-axis between the scales (SC2, SC4) and the detectors (D2, D4) is 0 or very small, influence on torque detection accuracy is negligible. On the other hand, in the optical sensors (OS1, OS3) that form the first system, a detection error occurs due to a change in detection position in the circumferential direction around the Z-axis occurs between the scales (SC1, SC3) and the detectors (D1, D3). However, in the optical sensors (OS1, OS3), since detection errors occur in opposite directions (positive direction and negative direction) in the circumferential direction around the Z-axis, by adding the outputs of the optical sensors (OS1, OS3), detection errors due to a translational force (Fx) can be canceled.

Similarly, when relative movement in the Y-axis direction occurs between the outer peripheral part 5 and the inner peripheral part 7, in the optical sensors (OS1, OS3) that form the first system, since a change in detection position (rotation amount) in the circumferential direction around the Z-axis between the scales (SC1, SC3) and the detectors (D1, D3) is 0 or very small, influence on torque detection accuracy is negligible. On the other hand, in the optical sensors (OS2, OS4) that form the second system, a detection error occurs due to a change in detection position in the circumferential direction around the Z-axis occurs between the scales (SC2, SC4) and the detectors (D2, D4). However, in the optical sensors (OS2, OS4), since detection errors occur in opposite directions (positive direction and negative direction) in the circumferential direction around the Z-axis, by adding the outputs of the optical sensors (OS2, OS4), detection errors due to a translational force (Fy) can be canceled.

When relative movement in a direction other than the X-axis direction and the Y-axis direction in the XY plane occurs between the outer peripheral part 5 and the inner peripheral part 7, in the first system, as described above, for a component in the Y-axis direction, influence on torque detection accuracy is negligible; and for a component in the X-axis direction, a detection error can be canceled by adding the outputs of the optical sensors (OS1, OS3). Further, in the second system, as described above, for a component in the X-axis direction, influence on torque detection accuracy is negligible; and for a component around the Y-axis, a detection error can be canceled by adding the outputs of the optical sensors (OS2, OS4). Therefore, by adding the outputs of the optical sensors (OS1, OS3) and adding the outputs of the optical sensors (OS2, OS4), the torque sensor 2 can cancel a detection error even when relative movement occurs in any direction in the XY plane.

When relative movement in the Z-axis direction occurs between the outer peripheral part 5 and the inner peripheral part 7, in any one of the optical sensors (OS1-OS4), since a change in detected position (rotation amount) in the circumferential direction around the Z-axis between the scales (SC1-SC4) and the detectors (D1-D4) is 0 or very small, influence on torque detection accuracy is negligible.

The addition part 65 adds the average value obtained by the division part 59 and the average value obtained by the division part 63. In other words, the addition part 65 adds the outputs (average values) of the first system and the second system, which are positioned 90 degrees apart in the circumferential direction. The division part 67 further calculates an average value of the average values by dividing by 2 the result obtained by adding the average values by the addition part 65.

As described above, by adding the outputs (average values) of the first system and the second system, which are positioned 90 degrees apart in the circumferential direction, when the torque sensor 2 is used in conjunction with the speed reducer 4 having a wave gear mechanism, a detection error due to torque ripple peculiar to the speed reducer 4 can be canceled. The wave gear mechanism has the circular spline 403, the flex spline 405, and the wave generator 407. The flex spline 405 is flexed into an elliptical shape by the wave generator 407 and engages with the circular spline 403 at a major axis portion thereof and disengages with the circular spline 403 at a minor axis portion thereof. When either the circular spline 403 or the flex spline 405 is fixed and the wave generator 407 is rotated clockwise, the flex spline 405 elastically deforms, and an engaging position with the circular spline 403 sequentially moves. When the wave generator 407 completes one rotation, in the case where the circular spline 403 is fixed, the flex spline 405 moves counterclockwise by the difference in the number of teeth between the circular spline 403 and the flex spline 405 (for example, 2). In the case where the flex spline 405 is fixed, the flex spline 405 moves clockwise by the difference in the number of teeth (for example, 2).

Figure 11:
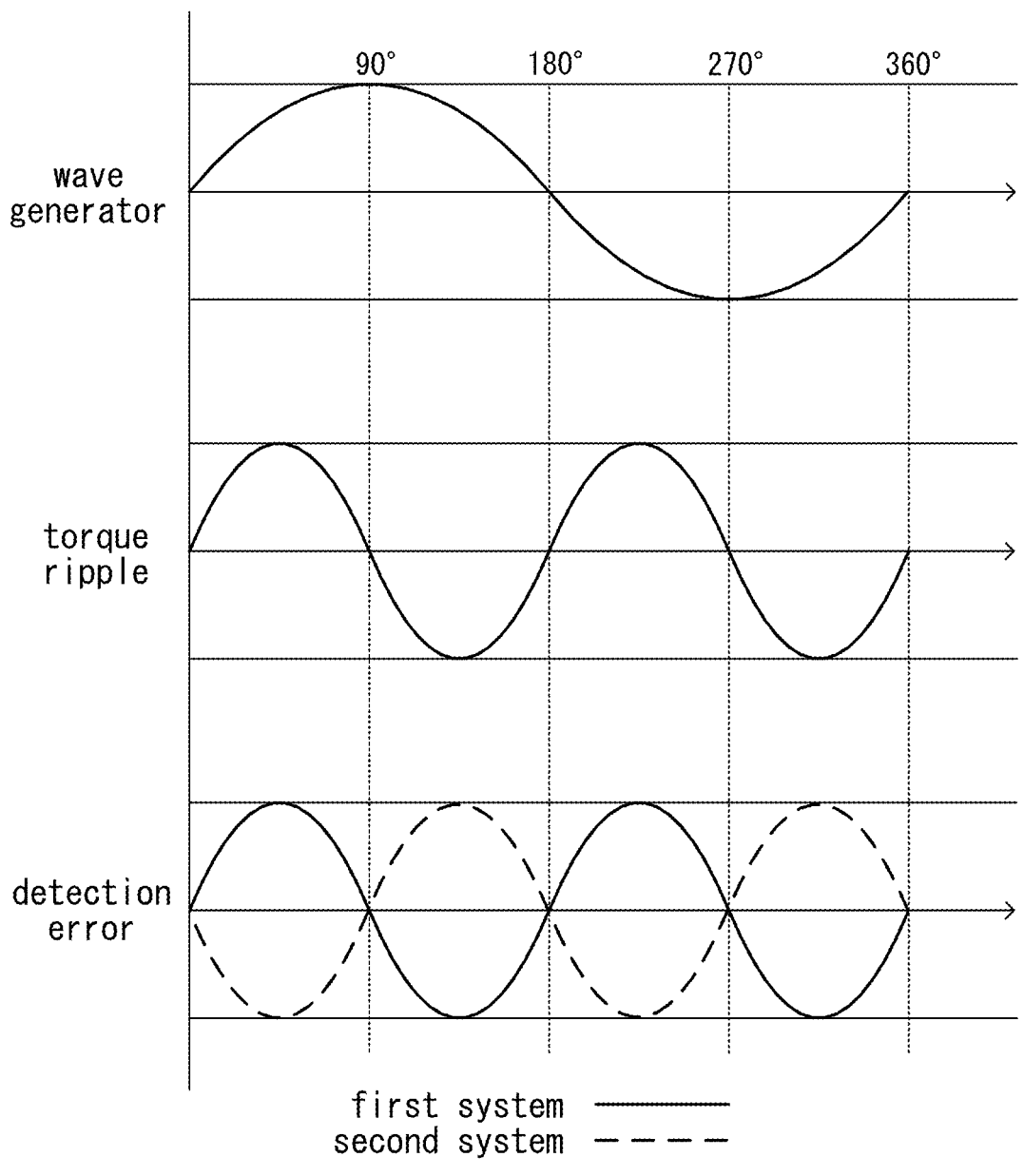
FIG. 11 is a graph for describing that detection errors due to torque ripple peculiar to a speed reducer having a wave gear mechanism are canceled by adding an output of a first system and an output of a second system.

With the structure of the wave gear mechanism described above, during one rotation (360 degrees) of the wave generator 407, the engaging position between the flex spline 405 and the circular spline 403 passes twice. As a result, as illustrated in FIG. 11, it may be possible that, for every one rotation of the wave generator 407, torque ripple of two cycles occurs and appears as a detection error of the torque sensor 2. The detection error is caused by the torque ripple and thus has a 180-degree cycle. On the other hand, since the optical sensors (OS1, OS3) of the first system and the optical sensors (OS2, OS4) of the second system are positioned 90 degrees apart in the circumferential direction, detection errors of their respective outputs have a phase difference of 90 degrees. Therefore, by adding the outputs (average values) of the first system and the second system, the torque sensor 2 can cancel the detection errors caused by the torque ripple peculiar to the speed reducer having the wave gear mechanism.

The torque calculation processing described above is an example, and the present invention is not limited to this. For example, when performing only cancellation of a detection error due to cross-axis interference, such as when using a speed reducer that does not have a wave gear mechanism, it is also possible that, without providing the addition part 65 and the division part 67, the average value obtained by the division part 59 and the average value obtained by the division part 63 are respectively output as independent torque values of the first system and the second system. In this case, it is possible to duplicate the sensor output while canceling a detection error due to cross-axis interference.

Further, it is also possible that the addition part 57 and the division part 59 are used to calculate an average value by adding the outputs of the first optical sensor (OS1) and the second optical sensor (OS2), which are positioned 90 degrees apart in the circumferential direction (it is also possible to use the outputs of the second optical sensor (OS2) and the third optical sensor (OS3)), and the addition part 61 and the division part 63 are used to calculate an average value of the outputs of the third optical sensor (OS3) and the fourth optical sensor (OS4), which are positioned 90 degrees apart in the circumferential direction (it is also possible to use the outputs of the fourth optical sensor (OS4) and the first optical sensor (OS1)), and use the addition part 65 and the division part 67 to calculate an average value of these average values. Also in this case, a detection error due to cross-axis interference can be canceled, and at the same time, a detection error due to torque ripple peculiar to a wave gear mechanism can also be canceled. Further, in this case, when performing only cancellation of a detection error due to the torque ripple, it is also possible that, without providing the addition part 65 and the division part 67, the average value obtained by the division part 59 and the average value obtained by the division part 63 are each output as an independent torque value. In this case, it is possible to duplicate the sensor output while canceling a detection error due to the torque ripple.

The division of the processing among the conversion parts (56, 58, 60, 62), the addition part 57, the division part 59, the addition part 61, the division part 63, the addition part 65, the division part 67, and the like described above is not limited to the above example. For example, the processing may be performed by an even smaller number of processing parts (for example, one processing part), or the processing may be performed by further subdivided processing parts. Further, these functions may be implemented by a program executed by a CPU provided on the substrates (PB1*b*, PB2*b*, PB3*b*, PB4*b*), or some or all of the functions may be implemented by an actual device such as an ASIC or FPGA, or other electrical circuits.

Damping Effect by Damping Part

Figure 12:
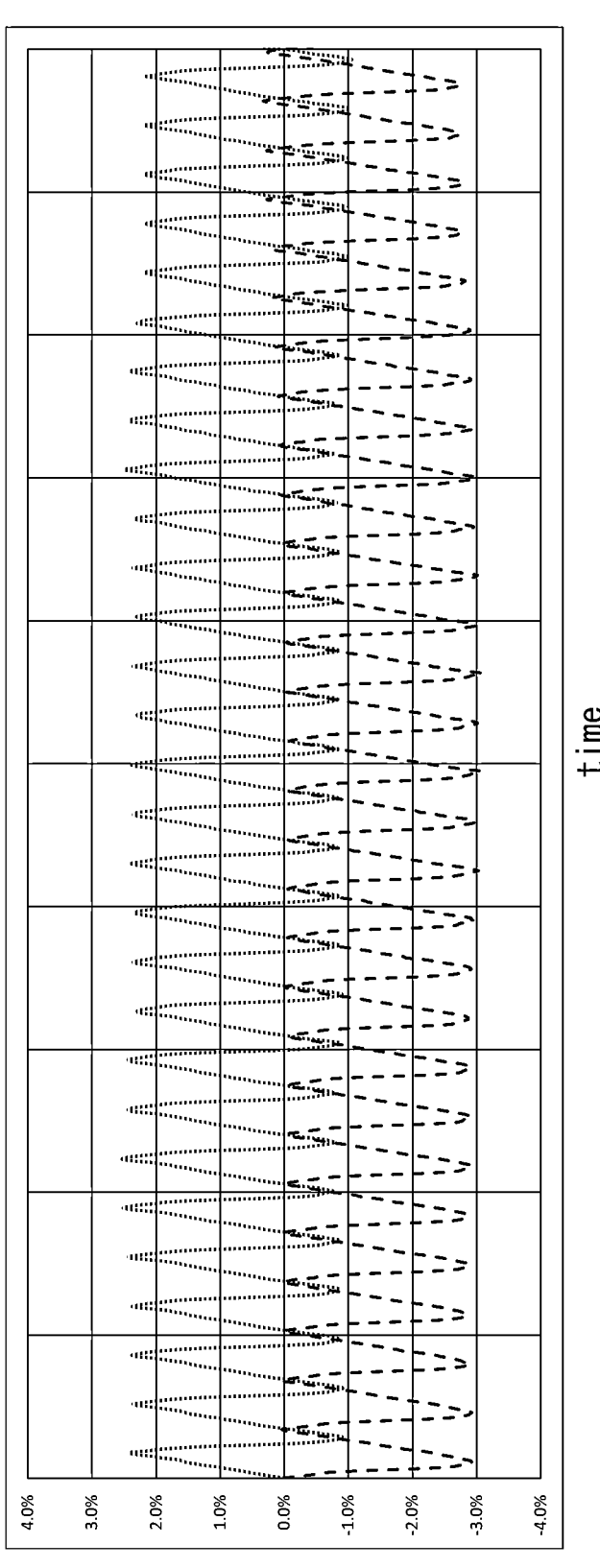
FIG. 12 is a graph showing an example of measurement results of output errors of the first system and output errors of the second system in a comparative example in which a damping part is not provided.
Figure 13:
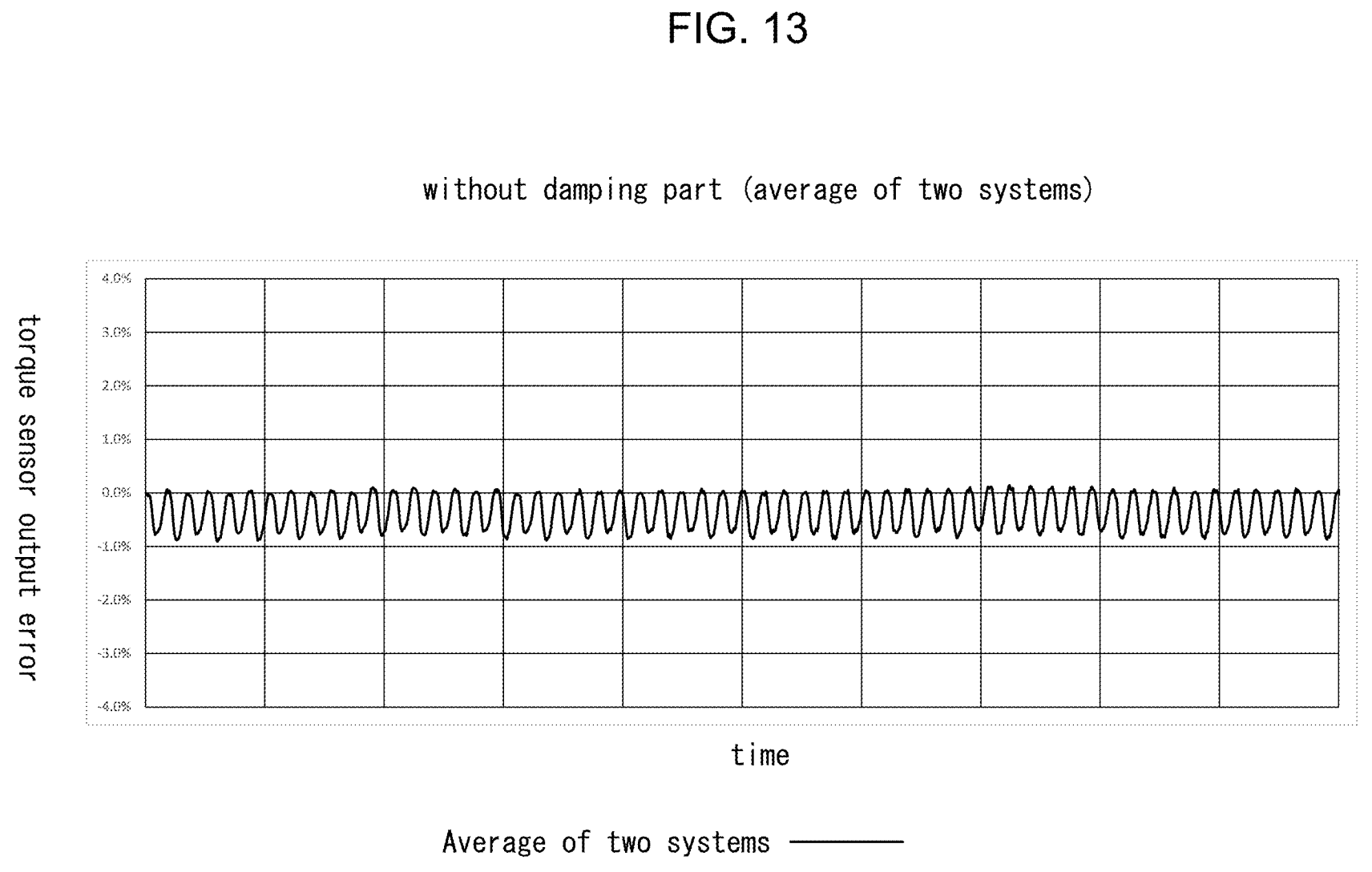
Figure 14:
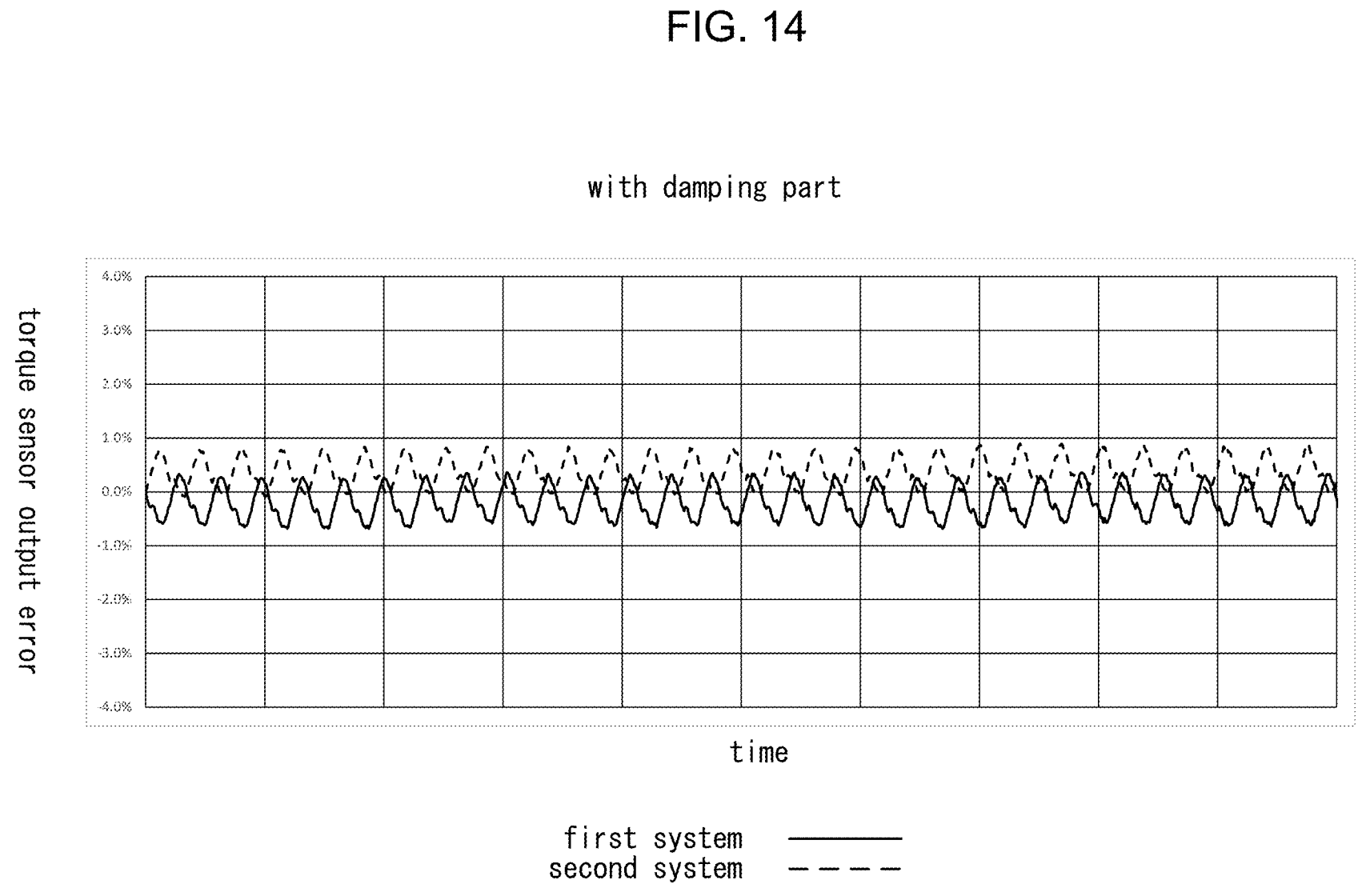
Figure 15:
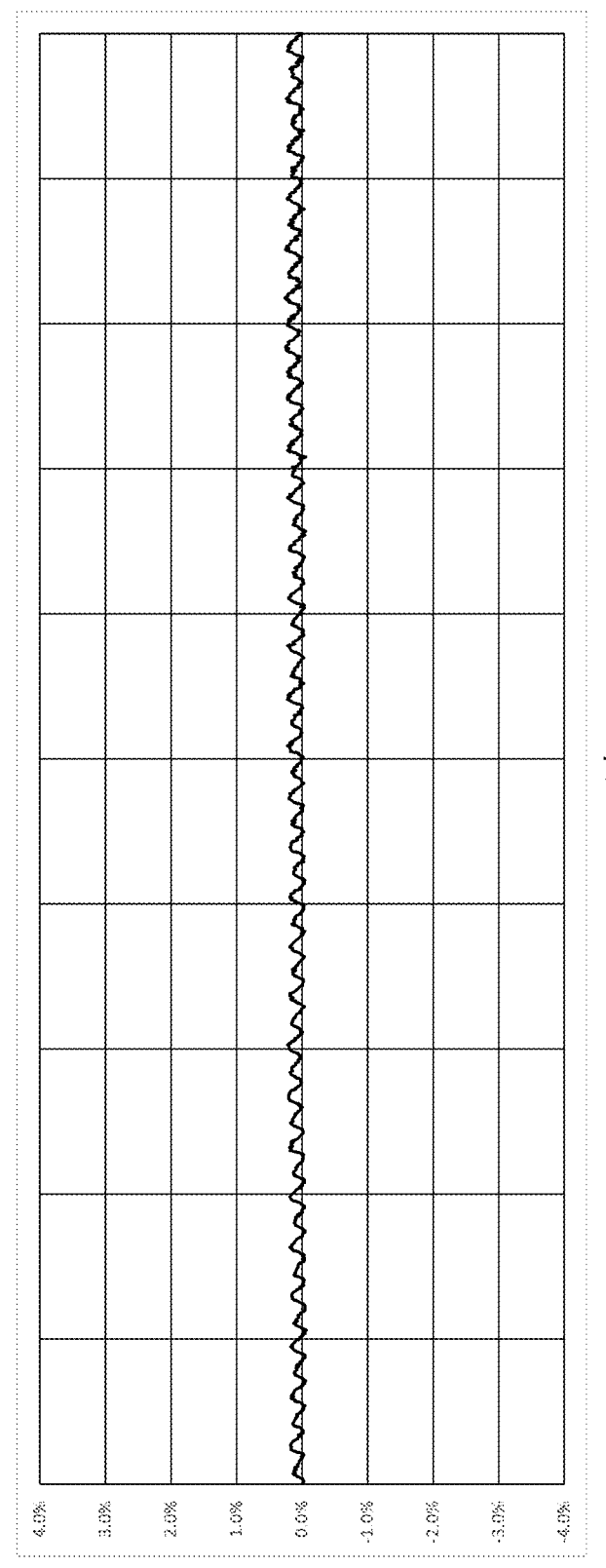
FIG. 15 is a graph showing an example of measurement results of output errors of average values of outputs of the first system and outputs of the second system in the embodiment in which a damping part is provided.

An example of a damping effect of the damping part 6 is described with reference to FIGS. 12-15. FIG. 12 is a graph showing an example of measurement results of output errors of the first system and output errors of the second system in a comparative example in which a damping part is not provided. FIG. 13 is a graph showing an example of measurement results of output errors of average values of outputs of the first system and outputs of the second system in the comparative example in which a damping part is not provided. FIG. 14 is a graph showing an example of measurement results of output errors of the first system and output errors of the second system in an embodiment in which a damping part is provided. FIG. 15 is a graph showing an example of measurement results of output errors of average values of outputs of the first system and outputs of the second system in the embodiment in which a damping part is provided. FIGS. 14 and 15 show measurement results in a case where a metal gasket is used as the damping part 6.

As shown in FIG. 12, in the case where the damping part 6 is not provided, the output of the first system and the output of the second system each have an output error of about 3% that occurs due to the torque ripple of the speed reducer 4 having a wave gear mechanism. As shown in FIG. 13, in the case where the damping part 6 is not provided, by averaging the output of the first system and the output of the second system, although the output error due to the torque ripple can be reduced, an error of about 1% remains.

As shown in FIG. 14, in the case where the damping part 6 is provided, due to the damping part 6, the influence of the torque ripple due to the speed reducer 4 is greatly reduced, and the output error in each of the output of the first system and the output of the second system is reduced to about 0.8%. As shown in FIG. 15, in the case where the damping part 6 is provided, by averaging the output of the first system and the output of the second system, the output error due to the torque ripple is about 0.2%, and the influence of the torque ripple of the speed reducer can be substantially eliminated. As described above, the robot 1 of the present embodiment includes: the speed reducer 4 that increases the first torque output from the motor 3 and outputs the second torque; the torque sensor 2 having the outer peripheral part 5 that outputs the second torque output from the speed reducer 4, and the sensor part 8 that detects at least a torque applied to the outer peripheral part 5; and the damping part 6 that is positioned in the transmission path of the second torque from the speed reducer 4 to the torque sensor 2 and damps the transmission of the second torque.

When the torque sensor 2 is positioned near the speed reducer 4, vibration peculiar to the speed reducer may be detected as torque ripple, which may reduce torque detection accuracy. According to the present embodiment, the transmission of the second torque is damped in the transmission path of the second torque from the speed reducer 4 to the torque sensor 2. As a result, the torque ripple can be reduced without changing a magnitude of the second torque transmitted from the speed reducer 4 to the torque sensor 2. As a result, influence of vibration of the speed reducer 4 can be reduced, and thus, torque detection accuracy can be improved.

In the present embodiment, the sensor part 8 may include the first optical sensor (OS1), the second optical sensor (OS2), the third optical sensor (OS3), and the fourth optical sensor (OS4), which optically detect torques.

In this case, the sensor part 8 is an optical detection system and has a high sensitivity, and thus, influence of ripple due to the speed reducer 4 becomes significantly evident. Therefore, by suppressing this influence, highly accurate torque detection based on a highly sensitive detection system can be realized.

In the present embodiment, the speed reducer 4 may include: the wave generator 407 that inputs the first torque output from the motor 3; the circular spline 403 and the flex spline 405 that increase the first torque input by the wave generator 407; and the circular spline 403 that outputs an increased second torque. The torque sensor 2 may include: the inner peripheral part 7 that inputs the second torque output from the circular spline 403; the outer peripheral part 5 that outputs the second torque input by the inner peripheral part 7; and the linking parts (9A-9D) that link the inner peripheral part 7 and the outer peripheral part 5. The optical sensors (OS1-OS4) may detect a torque based on a relative displacement between the inner peripheral part 7 and the outer peripheral part 5. The damping part 6 may be positioned in a transmission path of the second torque from the circular spline 403 to the inner peripheral part 7.

In this case, the transmission of the second torque can be damped in the transmission path of the second torque from the circular spline 403 of the speed reducer 4 to the inner peripheral part 7 of the torque sensor 2. As a result, the torque ripple can be reduced and the influence of the vibration of the speed reducer 4 can be reduced, and thus, torque detection accuracy can be improved.

In the present embodiment, the damping part 6 is interposed between the circular spline 403 and the inner peripheral part 7 and may be a member formed separately from the speed reducer 4 and the torque sensor 2.

In this case, a member formed separately from the speed reducer 4 and the torque sensor 2 can be interposed as the damping part 6 between the circular spline 403 of the speed reducer 4 and the inner peripheral part 7 of the torque sensor 2. In this way, by adopting a structure in which a separate member is interposed between the speed reducer 4 and the torque sensor 2, it is possible to have a simple structure and to facilitate easy functional enhancement by retrofitting with an existing structure. As a result, it is possible to improve performance of an existing production line in a short period of time.

In the present embodiment, the damping part 6 may be interposed between the first transmission surface 421 of the circular spline 403 that transmits the second torque and the second transmission surface 215 of the inner peripheral part 7 that transmits the second torque.

In this case, the second torque is transmitted to the damping part 6 via the first transmission surface 421 of the circular spline 403 of the speed reducer 4, and the second torque is transmitted to the inner peripheral part 7 of the torque sensor 2 via the second transmission surface 215 of the inner peripheral part 7 of the torque sensor 2. In this way, since the damping part 6 can be interposed in the transmission path of the second torque, the influence of the vibration of the speed reducer 4 can be more reliably reduced.

In the present embodiment, the robot 1 may further have the bolts 201 that fix the inner peripheral part 7 of the torque sensor 2 to the circular spline 403 of the speed reducer 4. In this case, the damping part 6 may be interposed between the first transmission surface 421 and the second transmission surface 215 at a position fixed by the bolts 201.

In this case, the damping part 6 can be in firm contact with the first transmission surface 421, and at the same time, the damping part 6 can be in firm contact with the second transmission surface 215. Therefore, reliability of transmission of the second torque between the damping part 6 and the first transmission surface 421 and between the damping part 6 and the second transmission surface 215 can be improved. As a result, effectiveness of the function of the damping part 6 can be increased, and the influence of the vibration of the speed reducer 4 can be more reliably reduced. Further, without additional components for positioning and fixing, the damping part 6 can be positioned and fixed with respect to the two transmission surfaces (421, 215).

In the present embodiment, the damping part 6 may be an elastic shim member sandwiched between the first transmission surface 421 and the second transmission surface 215.

In this case, the torque ripple can be reduced by elastic deformation of the shim member. Therefore, the influence of the vibration of the speed reducer 4 can be more reliably reduced. Further, for example, by using a metal gasket as the shim member, a structure excellent in sealing performance and heat resistance can be provided.

MODIFIED EXAMPLES

The disclosed embodiment is not limited to the above-described content. Various modifications are possible within the scope without departing from the spirit and the technical idea of the disclose embodiment. In the following, such modified examples are described.

Damping Part Formed as Part of Output Part of Speed Reducer

In the above-described embodiment, the case is described where the damping part 6 is a member formed separately from the speed reducer 4 and the torque sensor 2. However, the damping part is not limited to being a separate member. For example, the damping part may be formed as a part of the output part of the speed reducer.

Figure 16:
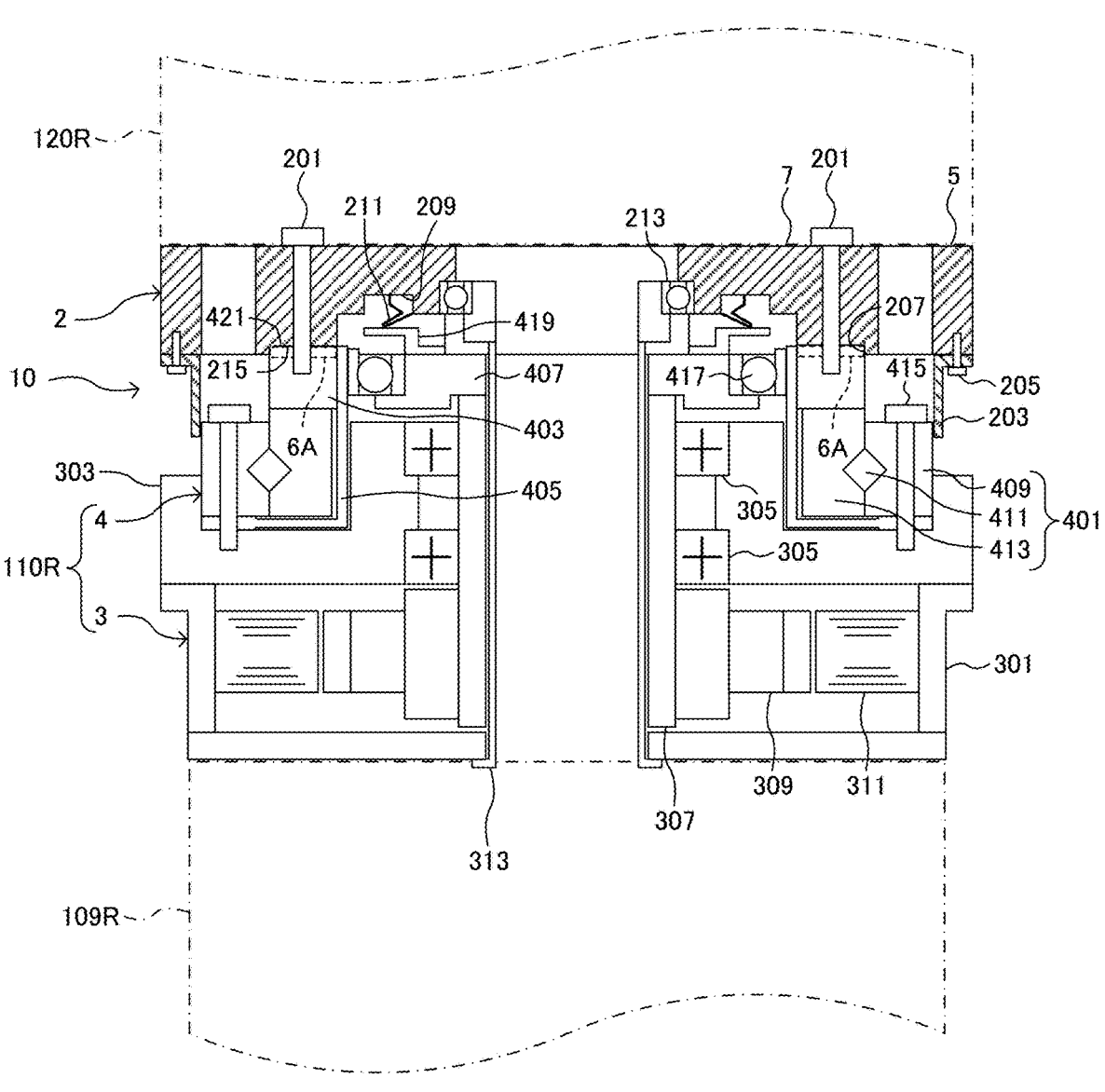
FIG. 16 is a cross-sectional view illustrating an example of a cross-sectional structure of a front end part of an arm of a robot in a modified example in which a damping part is formed as a part of an output part of a speed reducer.

An example of a structure of a damping part of the present modified example is described with reference to FIG. 16. In FIG. 16, a structural element that is the same as in FIG. 2 described above is denoted using the same reference numeral symbol and description thereof is omitted. As illustrated in FIG. 16, a damping part (6A) in the present modified example is formed as a part of the circular spline 403 (an example of an output part) of the speed reducer 4. The damping part (6A) is a ring-shaped part formed on the front end side (hand (120R) side) of the circular spline 403. The damping part (6A) is not particularly limited in material, shape, or the like, as long as the damping part (6A) has a property of being capable of damping the transmission of the second torque from the speed reducer 4 to the torque sensor 2. For example, the damping part (6A) may be formed as a part with a lower Young's modulus than other parts of the circular spline 403. In this case, for example, the damping part (6A) may be formed of a softer material than the other parts. Additionally or alternatively, the damping part (6A) may be formed to have a more flexible structure than the other parts, for example, by forming multiple recesses or protrusions.

In the present modified example, a front end-side surface of the damping part (6A) becomes the first transmission surface 421, which is in contact with and fixed to the second transmission surface 215 of the inner peripheral part 7 of the torque sensor 2 by the bolts 201.

According to the present modified example, the damping part (6A) is formed as a part of the circular spline 403 of the speed reducer 4. In this case, the circular spline 403 of the speed reducer 4 itself can damp the transmission of the second torque. This eliminates the need to interpose a separate member between the speed reducer 4 and the torque sensor 2, and thus, the drive mechanism 10 or the robot 1 capable of improving torque detection accuracy by reducing the influence of the vibration of the speed reducer 4 can be realized with a compact structure. Further, since the number of components can be reduced, assembly becomes easier. Further, by integrating the damping part (6A) into the speed reducer 4, relative positional accuracy between the speed reducer 4 and the damping part (6A) is increased, and the vibration can be more reliably reduced.

In the present modified example, the damping part (6A) may be formed as a part with a lower Young's modulus than other parts. In this case, since the damping part (6A) has a lower Young's modulus than other parts, the damping part itself can be elastically deformed to reduce torque ripple. Therefore, the influence of the vibration of the speed reducer 4 can be more reliably reduced.

Damping Part Formed as Part of Input Part of Torque Sensor

In the above-described embodiment, the case is described where the damping part 6 is a member formed separately from the speed reducer 4 and the torque sensor 2. However, the damping part is not limited to being a separate member. For example, the damping part may be formed as a part of the input part of the torque sensor.

Figure 17:
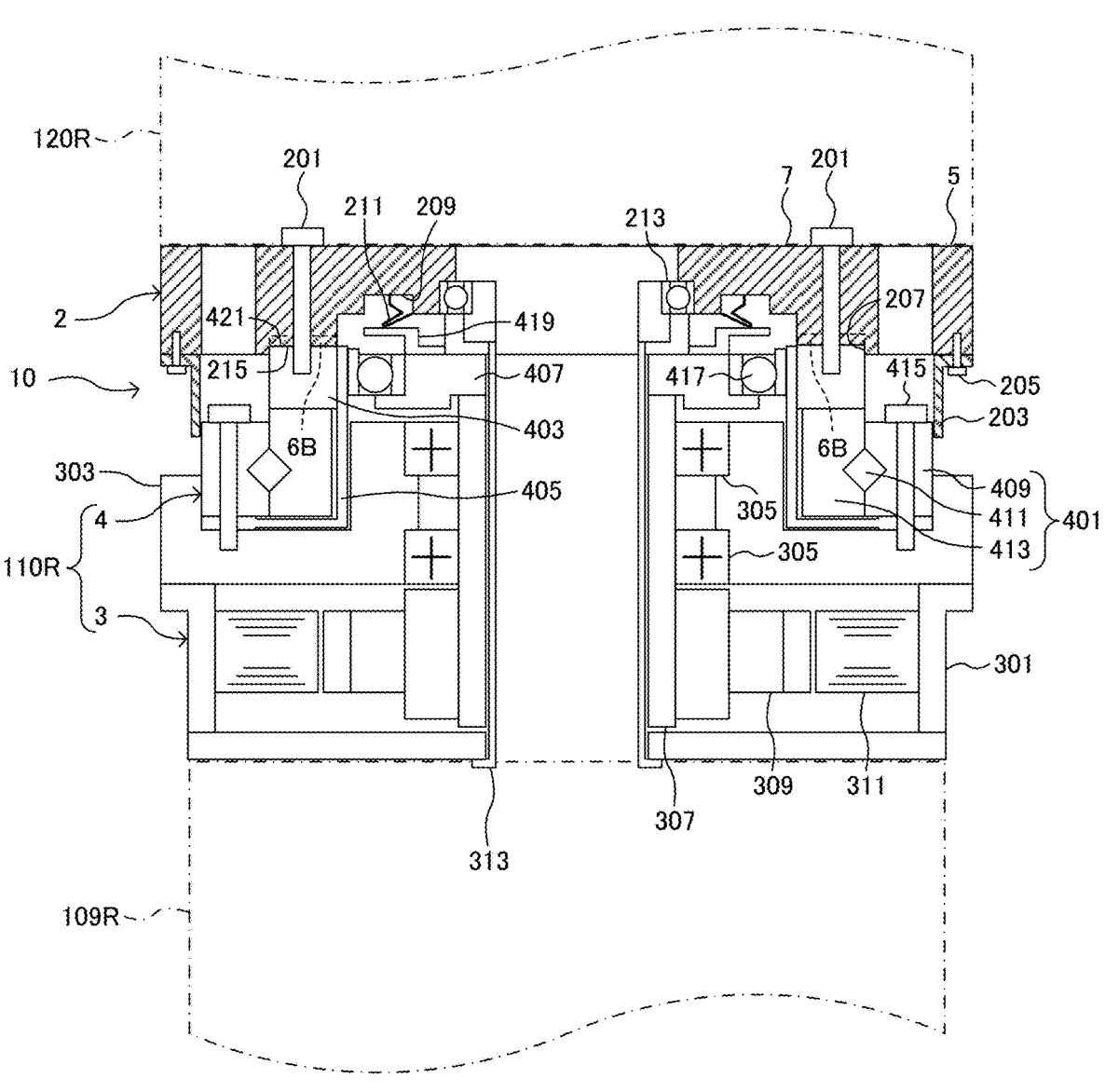
FIG. 17 is a cross-sectional view illustrating an example of a cross-sectional structure of a front end part of an arm of a robot when a damping part is formed as a part of an input part of a torque sensor.

An example of a structure of a damping part of the present modified example is described with reference to FIG. 17. In FIG. 17, a structural element that is the same as in FIG. 2 described above is denoted using the same reference numeral symbol and description thereof is omitted. As illustrated in FIG. 17, a damping part (6B) in the present modified example is formed as a part of the inner peripheral part 7 (an example of an input part) of the torque sensor 2. The damping part (6B) is a ring-shaped part formed on the based end side (opposite side with respect to the hand (120R)) of the inner peripheral part 7. The damping part (6B) is not particularly limited in material, shape, or the like, as long as the damping part (6B) has a property of being capable of damping the transmission of the second torque from the speed reducer 4 to the torque sensor 2. For example, the damping part (6B) may be formed as a part with a lower Young's modulus than other parts of the inner peripheral part 7. In this case, for example, the damping part (6B) may be formed of a softer material than the other parts. Additionally or alternatively, the damping part (6B) may be formed to have a more flexible structure than the other parts, for example, by forming multiple recesses or protrusions.

In the present modified example, a base end-side surface of the damping part (6B) becomes the second transmission surface 215, which is in contact with and fixed to the first transmission surface 421 of the circular spline 403 of the speed reducer 4 by the bolts 201.

According to the present modified example, the damping part (6B) is formed as a part of the inner peripheral part 7 of the torque sensor 2. In this case, the inner peripheral part 7 of the torque sensor 2 itself can damp the transmission of the second torque. This eliminates the need to interpose a separate member between the speed reducer 4 and the torque sensor 2, and thus, the drive mechanism 10 or the robot 1 capable of improving torque detection accuracy by reducing the influence of the vibration of the speed reducer 4 can be realized with a compact structure. Further, since the number of components can be reduced, assembly becomes easier. Further, by integrating the damping part (6B) into the torque sensor 2, relative positional accuracy between the torque sensor 2 and the damping part (6B) is increased, and the vibration can be more reliably reduced.

In the present modified example, the damping part (6B) may be formed as a part with a lower Young's modulus than other parts. In this case, since the damping part (6B) has a lower Young's modulus than other parts, the damping part itself can be elastically deformed to reduce torque ripple. Therefore, the influence of the vibration of the speed reducer 4 can be more reliably reduced.

Miscellaneous

The problems or effects to be solved or achieved by the above-described embodiment or modified examples or the like are not limited to the above-described contents. That is, the embodiment, the modified examples, or the like can also solve a problem not described above or achieve an effect not described above or can only partially solve a problem not described above or only partially achieve an effect not described above.

In the above description, when there is a description such as "vertical," "parallel," "flat surface," or the like, the description is not in a strict sense. That is, "vertical," "parallel" or "flat surface" means "substantially vertical," "substantially parallel" or "substantially flat surface," when tolerances and errors in design and in manufacturing are within allowed ranges.

Further, in the above description, when there is a description such as that an external dimension or size, a shape, a position, or the like is "identical," "same," "equal," "different," or the like, the description is not in a strict sense. That is, "identical," "same," "equal" or "different" means "substantially identical," "substantially same," "substantially equal" or "substantially different" when tolerances and errors in design and in manufacturing are within allowed ranges.

Further, in addition to those already described above, methods according to the above-described embodiment and modified examples may also be appropriately combined and utilized. In addition, although not illustrated, various modifications may be made to the above-described embodiment and modified examples within the scope without departing from the spirit thereof.

International Publication No. 2019/021442 describes a torque sensor. This torque sensor includes: a first member and a second member; a linking member that links the first member and the second member in a manner allowing the first member and the second member to relatively rotate around a first axis by an amount corresponding to a magnitude of a torque and in a manner allowing the first member and the second member to relatively rotate around a second axis perpendicular to the first axis due to a force other than a torque; a scale that is positioned on the first member; a light emitting part that is positioned on the second member and emits light to the scale from a position on the second axis; and a light receiving part that is positioned on the second member and receives light emitted from the light emitting part and reflected by the scale.

When the torque sensor is positioned near a speed reducer, it is desired that influence of vibration of the speed reducer is reduced and detection accuracy is improved.

A robot, a drive mechanism, a speed reducer, a torque sensor, and a torque detection method according to embodiments of the present invention improve torque detection accuracy.

According to one aspect of the present invention, a robot is applied that includes: a speed reducer that increases a first torque output from a motor and outputs a second torque; a torque sensor having an output part that outputs the second torque output from the speed reducer and a sensor part that detects at least a torque applied to the output part; and a damping part that is positioned in a transmission path of the second torque from the speed reducer to the torque sensor and damps transmission of the second torque.

Further, according to another aspect of the present invention, a drive mechanism is applied that includes: a speed reducer that increases a first torque output from a motor and outputs a second torque; a torque sensor having an output part that outputs the second torque output from the speed reducer and a sensor part that detects at least a torque applied to the output part; and a damping part that is positioned in a transmission path of the second torque from the speed reducer to the torque sensor and damps transmission of the second torque.

Further, according to another aspect of the present invention, a speed reducer is applied that includes: an output part that increases a first torque output from a motor and outputs a second torque to a torque sensor; and a damping part that is formed as a part of the output part and damps transmission of the second torque to the torque sensor.

Further, according to another aspect of the present invention, a torque sensor is applied that includes: an input part that inputs a torque output from a speed reducer; an output part that outputs the torque input by the input part; a sensor part that detects at least a torque applied to the output part;

and a damping part that is formed as a part of the input part and damps transmission of the torque from the speed reducer.

Further, according to another aspect of the present invention, a torque detection method is applied that includes: increasing a first torque output from a motor using a speed reducer to output a second torque; outputting the second torque output from the speed reducer using an output part of a torque sensor; detecting at least a torque applied to the output part using a sensor part of the torque sensor; and damping transmission of the second torque in a transmission path of the second torque from the speed reducer to the torque sensor.

Obviously, numerous modifications and variations of the present invention are possible in light of the above teachings. It is therefore to be understood that within the scope of the appended claims, the invention may be practiced otherwise than as specifically described herein.

The invention claimed is:

1. A robot, comprising:
a speed reducer configured to increase a first torque output from a motor to generate a second torque, and including a first output part configured to output the second torque;
a torque sensor including
a second input part configured to input the second torque output from the first output part,
a second output part configured to output the second torque input by the second input part, and
a sensor part configured to detect at least a torque applied to the second output part; and
a damper positioned between the first output part and the second input part in a transmission path of the second torque from the speed reducer to the torque sensor and configured to damp transmission of the second torque.

2. The robot according to claim 1, wherein the sensor part includes an optical sensor configured to optically detect the torque.

3. The robot according to claim 2, wherein the speed reducer further includes:
a first input part configured to input the first torque output from the motor, and
a speed reducing part configured to increase the first torque input by the first input part,
the torque sensor further includes a linking part configured to link the second input part and the second output part, and
the optical sensor is configured to detect the torque based on a relative displacement between the second input part and the second output part.

4. The robot according to claim 1, wherein the damper is a member that is interposed between the first output part and the second input part and is formed separately from the speed reducer and the torque sensor.

5. The robot according to claim 4, wherein the member is interposed between a first transmission surface configured to transmit the second torque of the first output part and a second transmission surface configured to transmit the second torque of the second input part.

6. The robot according to claim 5, further comprising:
a fixer configured to fix the second input part to the first output part,
wherein the member is interposed between the first transmission surface and the second transmission surface at a position fixed by the fixer.

7. The robot according to claim 6, wherein the member is an elastic shim member sandwiched between the first transmission surface and the second transmission surface.

8. The robot according to claim 5, wherein the member is an elastic shim member sandwiched between the first transmission surface and the second transmission surface.

9. The robot according to claim 1, wherein the damper is formed as a part of the first output part.

10. The robot according to claim 9, wherein the damper is formed as a part with a lower Young's modulus than other parts.

11. The robot according to claim 1, wherein the damper is formed as a part of the second input part.

12. The robot according to claim 11, wherein the damper is formed as a part with a lower Young's modulus than other parts.

13. The robot according to claim 1, wherein
the speed reducer further includes:
a first input part configured to input the first torque output from the motor, and
a speed reducing part configured to increase the first torque input by the first input part.

14. The robot according to claim 13, wherein the torque sensor further includes a linking part configured to link the second input part and the second output part.

15. The robot according to claim 14, wherein the damper is a member that is interposed between the first output part and the second input part and is formed separately from the speed reducer and the torque sensor.

16. The robot according to claim 15, wherein the member is interposed between a first transmission surface configured to transmit the second torque of the first output part and a second transmission surface configured to transmit the second torque of the second input part.

17. A torque sensor, comprising:
an input part configured to input a torque output from a first output part of a speed reducer;
a second output part configured to output the torque input by the input part; and
a sensor part configured to detect at least a torque applied to the second output part,
wherein the input part includes a damper positioned between the first output part and the input part in a transmission path of the torque from the speed reducer to the torque sensor and formed as a part of the input part, and configured to damp transmission of the torque from the speed reducer.

18. A torque detection method, comprising:
increasing a first torque output from a motor using a speed reducer to output a second torque from a first output part of the speed reducer;
inputting the second torque output from the first output part using an input part of a torque sensor;
outputting the second torque input by the input part using a second output part of the torque sensor;
detecting at least a torque applied to the second output part using a sensor part of the torque sensor; and
damping transmission of the second torque using a damper positioned between the first output part and the input part in a transmission path of the second torque from the speed reducer to the torque sensor.

19. The torque detection method according to claim 18, wherein the damper is formed as a part of the first output part.

20. The torque detection method according to claim 18, wherein the damper is formed as a part of the input part.

* * * * *